(12) United States Patent
Ohta et al.

(10) Patent No.: US 10,671,441 B2
(45) Date of Patent: Jun. 2, 2020

(54) COMMUNICATION SYSTEM, MANAGEMENT APPARATUS, CONTROL APPARATUS, AND COMMUNICATION METHOD

(71) Applicant: NEC Corporation, Tokyo (JP)

(72) Inventors: Yoshinobu Ohta, Tokyo (JP); Kazuhiro Egashira, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 37 days.

(21) Appl. No.: 15/780,265

(22) PCT Filed: Nov. 28, 2016

(86) PCT No.: PCT/JP2016/004973
§ 371 (c)(1),
(2) Date: May 31, 2018

(87) PCT Pub. No.: WO2017/094246
PCT Pub. Date: Jun. 8, 2017

(65) Prior Publication Data
US 2018/0349203 A1    Dec. 6, 2018

(30) Foreign Application Priority Data

Dec. 1, 2015    (JP) ................................. 2015-234664

(51) Int. Cl.
*G06F 9/50* (2006.01)
*H04W 8/08* (2009.01)
(Continued)

(52) U.S. Cl.
CPC ........ *G06F 9/5077* (2013.01); *G06F 9/45558* (2013.01); *H04W 8/082* (2013.01);
(Continued)

(58) Field of Classification Search
None
See application file for complete search history.

(56) References Cited

U.S. PATENT DOCUMENTS

2010/0226372 A1    9/2010    Watanabe
2010/0272013 A1*   10/2010   Horn ..................... H04W 76/12
                                                              370/328
(Continued)

FOREIGN PATENT DOCUMENTS

| JP | 2014-179673 A | 9/2014 |
|----|---------------|--------|
| JP | 2014-239334 A | 12/2014 |
| WO | 2015/178031 A1 | 11/2015 |

OTHER PUBLICATIONS

Communication dated Nov. 12, 2018, from the European Patent Office in counterpart European Application No. 16870187.8.
(Continued)

*Primary Examiner* — Faruk Hamza
*Assistant Examiner* — Cassandra L Decker
(74) *Attorney, Agent, or Firm* — Sughrue Mion, PLLC

(57) ABSTRACT

A communication system according to the present disclosure includes: a management apparatus (30) configured to manage positional information regarding a communication terminal (10); a server (50) configured to provide a communication service for the communication terminal (10), and a control apparatus (60) configured to control start or stop of a communication function included in a communication apparatus (40). The server (50) is arranged in the vicinity of a base station (20), the management apparatus (30) transmits the positional information regarding the communication terminal (10) to the control apparatus (60), the control apparatus (60) controls start or stop of the communication function that the communication apparatus (40) includes based on the positional information, and the control apparatus (60) notifies the communication terminal (10) of start (Continued)

or stop of the communication function that the communication apparatus (40) includes via the management apparatus (30).

15 Claims, 22 Drawing Sheets

(51) Int. Cl.
    *H04W 88/16*     (2009.01)
    *G06F 9/455*     (2018.01)
    *H04W 76/10*     (2018.01)
    *H04W 92/04*     (2009.01)
    *H04W 64/00*     (2009.01)
    *H04W 40/20*     (2009.01)
    *H04W 76/30*     (2018.01)

(52) U.S. Cl.
    CPC .......... *H04W 64/00* (2013.01); *H04W 76/10* (2018.02); *H04W 88/16* (2013.01); *H04W 92/04* (2013.01); *G06F 2009/45595* (2013.01); *H04W 40/20* (2013.01); *H04W 76/30* (2018.02)

(56) References Cited

U.S. PATENT DOCUMENTS

| | | | |
|---|---|---|---|
| 2012/0039213 A1* | 2/2012 | Cheng | H04W 76/12 370/254 |
| 2012/0076121 A1 | 3/2012 | Choi et al. | |
| 2014/0113637 A1 | 4/2014 | Guan et al. | |
| 2017/0086049 A1* | 3/2017 | Vrzic | H04L 67/327 |
| 2018/0192330 A1* | 7/2018 | Yamasaki | H04W 36/16 |

OTHER PUBLICATIONS

Mobile-Edge Computing-Introductory Technical White Paper, Sep. 2014, pp. 1-36, Issue 1.
Hiromi Hirai et al., "A study on Gateway Selection Method for Ultra-low Latency Services in IoT Era," IEICE Technical Report, Oct. 8, 2015, pp. 43-46, vol. 115, No. 25.
International Search Report of PCT/JP2016/004973 dated Jan. 31, 2017.

* cited by examiner

| TAC | MEC SERVER NAME |
|---|---|
| 0001 | MEC001 |
| 0002 | MEC002 |
| 0003 | MEC003 |

| VIM DEPLOYMENT PATTERN | OPERATIONS OF NFVO/VNFM | OPERATION OF VIM | REFERENCE POINT THROUGH WHICH POSITIONAL INFORMATION FLOWS | |
|---|---|---|---|---|
| FIG. 17 | NOT INVOLVE IN POSITIONAL INFORMATION | SELECT NFVI BASED ON POSITIONAL INFORMATION | FIG. 13 | Os-Ma-nfvo/Or-vi |
| | | | FIG. 14 | Ve-Vnfm/Vi-Vnfm |
| | | | FIG. 15 | Ve-Vnfm/Vi-Vnfm |
| | | | FIG. 16 | Or-Vnfm/Or-vi |
| FIG. 18 | NOT INVOLVE IN POSITIONAL INFORMATION | SELECT CHILD VIM BASED ON POSITIONAL INFORMATION SELECT NFVI BASED ON POSITIONAL INFORMATION | FIG. 13 | Os-Ma-nfvo/Or-vi |
| | | | FIG. 14 | Ve-Vnfm/Vi-Vnfm |
| | | | FIG. 15 | Ve-Vnfm/Vi-Vnfm |
| | | | FIG. 16 | Or-Vnfm/Or-vi |
| FIG. 19 | SELECT VIM BASED ON POSITIONAL INFORMATION | NOT RECEIVE POSITIONAL INFORMATION | FIG. 13 | Os-Ma-nfvo |
| | | | FIG. 14 | Ve-Vnfm |
| | | | FIG. 15 | Ve-Vnfm |
| | | | FIG. 16 | Or-Vnfm |
| FIG. 20 | SELECT VIM BASED ON POSITIONAL INFORMATION | SELECT CHILD VIM BASED ON (PART OF) POSITIONAL INFORMATION | FIG. 13 | Os-Ma-nfvo/Or-vi |
| | | | FIG. 14 | Ve-Vnfm/Vi-Vnfm |
| | | | FIG. 15 | Ve-Vnfm/Vi-Vnfm |
| | | | FIG. 16 | Or-Vnfm/Or-vi |

COMMUNICATION SYSTEM, MANAGEMENT APPARATUS, CONTROL APPARATUS, AND COMMUNICATION METHOD

CROSS REFERENCE TO RELATED APPLICATIONS

This application is a National Stage of International Application No. PCT/JP2016/004973 filed Nov. 28, 2016, claiming priority based on Japanese Patent Application No. 2015-234664 filed Dec. 1, 2015, the disclosure of which is incorporated herein in its entirety by reference.

TECHNICAL FIELD

The present disclosure relates to a communication system, a management apparatus, a communication method, and a program, and relates to, in particular, a communication system, a management apparatus, a communication method, and a program that control a communication apparatus.

BACKGROUND ART

It has been required that future networks for performing data communication achieve low-latency services for the purpose of enabling these future networks to be applied to vehicle-to-vehicle communications and road-vehicle communications (V2X) and the like and that the load of a core network be reduced for the purpose of enabling these future networks to transmit a large amount of data due to the spread of Machine to Machine (M2M) and Internet of Things (IoT). Of technologies for satisfying the requirements for these future networks, technologies regarding Mobile Edge Computing (MEC) have attracted attention. Non-Patent Literature 1 discloses a network configuration and the like that uses the MEC.

Specifically, in the MEC, a server that provides a service is desirably arranged in the vicinity of a terminal held by a user. In order to achieve this arrangement, it has been proposed to arrange the server in the vicinity of a base station in a mobile communication system. By arranging the server in the vicinity of the radio base station to which the terminal is connected, it is expected to reduce the time required for the transmission between the terminal and the server (reduce the transmission delay). Further, by arranging the server in the vicinity of the base station, data can be directly transmitted (offloaded) from the base station to the server without passing the core network. Alternatively, data can be directly transmitted from the server to the base station without communicating through the core network. Accordingly, the amount of traffic flowing into the core network can be reduced, whereby it is expected to reduce the load of the core network.

CITATION LIST

Non-Patent Literature

[Non-Patent Literature 1] Mobile-Edge Computing-Introductory Technical White Paper September 2014

SUMMARY OF INVENTION

Technical Problem

However, even when the server that provides the services is installed in the vicinity of the base station, the terminal cannot always receive a low-latency service from the server unless the route between the terminal that requires the provision of the service and the server is efficiently configured.

One of the objects to be attained by the present disclosure is to provide a communication system, a management apparatus, a communication method, and a program capable of allowing the server to provide a low-latency service for the communication terminal.

Solution to Problem

A communication system according to a first aspect of the present disclosure includes: a communication terminal; a base station connected to the communication terminal; a management apparatus configured to manage positional information regarding the communication terminal; a server configured to provide a communication service for the communication terminal; a communication apparatus configured to connect the base station to the server; and a control apparatus configured to control start or stop of a communication function that the communication apparatus includes, in which the server is arranged in the vicinity of the base station, the management apparatus transmits the positional information regarding the communication terminal to the control apparatus, the control apparatus controls start or stop of the communication function that the communication apparatus includes based on the positional information, and the control apparatus notifies the communication terminal of start or stop of the communication function via the management apparatus.

A management apparatus according to a second aspect of the present disclosure includes: a positional information management unit configured to manage positional information regarding a communication terminal connected to a base station; and a communication unit configured to transmit the positional information regarding the communication terminal to a control apparatus configured to control start or stop of a communication function included in a communication apparatus based on the positional information, the communication apparatus being configured to connect the base station to a server configured to provide a communication service for the communication terminal, in which the server is arranged in the vicinity of the base station and the control apparatus notifies the communication terminal of start or stop of the communication function via the control apparatus.

A communication method according to a third aspect of the present disclosure includes: managing positional information regarding a communication terminal connected to a base station; and transmitting the positional information regarding the communication terminal to a control apparatus configured to control start or stop of a communication function included in a communication apparatus based on the positional information, the communication apparatus being configured to connect the base station to a server configured to provide a communication service for the communication terminal, in which the server is arranged in the vicinity of the base station and the control apparatus notifies the communication terminal of start or stop of the communication function via the control apparatus.

A program according to a fourth aspect of the present invention causes a computer to perform the following processing of: managing positional information regarding a communication terminal connected to a base station; and transmitting positional information regarding the communication terminal to a control apparatus configured to control start or stop of a communication function included in a communication apparatus based on the positional information, the communication apparatus being configured to connect the base station to a server configured to provide a communication service for the communication terminal, in which the server is arranged in the vicinity of the base station and the control apparatus notifies the communication terminal of start or stop of the communication function via the control apparatus.

Advantageous Effects of Invention

According to the present disclosure, it is possible to provide a communication system, a management apparatus, a communication method, and a program capable of allowing the server to provide a low-latency service for the communication terminal.

BRIEF DESCRIPTION OF DRAWINGS

FIG. 10 is a diagram showing information in which positional information regarding the UE held by a MANO and an MEC server are associated with each other according to the fourth embodiment;

FIG. 21 is a diagram for describing reference points through which positional information regarding the UE flow according to the eighth embodiment.

DESCRIPTION OF EMBODIMENTS

First Embodiment

Figure 1:
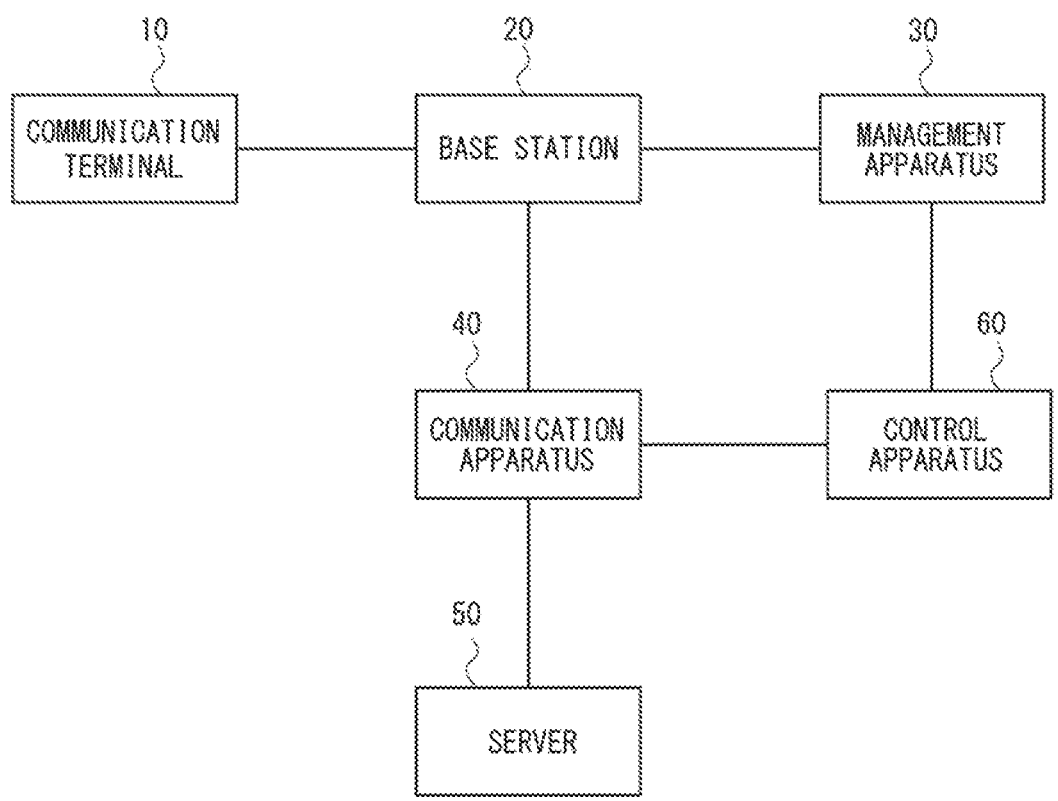
FIG. 1 is a configuration diagram of a communication system according to a first embodiment.

Hereinafter, with reference to the drawings, embodiments of the present disclosure will be explained. Referring to FIG. 1, a configuration example of a communication system according to the first embodiment of the present disclosure will be explained. The communication system shown in FIG. 1 includes a communication terminal 10, a base station 20, a management apparatus 30, a communication apparatus 40, a server 50, and a control apparatus 60. The communication terminal 10, the base station 20, the management apparatus 30, the communication apparatus 40, the server 50, and the control apparatus 60 may each be a computer apparatus that operates by a processor executing a program stored in a memory.

The communication terminal 10 may be a mobile phone terminal, a smartphone terminal, a tablet terminal or the like. Alternatively, the communication terminal 10 may be an M2M terminal, a Machine Type Communication (MTC) terminal, an IoT terminal or the like.

The server 50 provides a communication service for the communication terminal 10. The communication service may be, for example, a service that requires a delay time shorter than a predetermined delay time as a transmission delay. The communication service may be, for example, a service that requires a real-time control such as a remote drive control or a remote surgery. Otherwise, the communication service may be, for example, a service related to packet data transmission such as a video distribution service or a voice communication service. The server 50 may be arranged, for example, in the vicinity of or in proximity to the base station 20 to which the communication terminal 10 is connected. The base station 20 may be connected to the communication terminal 10 by wire or wirelessly. The vicinity of the base station 20 may indicate that the distance between the base station 20 and the server 50 is shorter than a predetermined distance. Otherwise, the vicinity of the base station 20 may indicate a location that is adjacent to the base station 20. The location that is adjacent to the base station 20 may be, for example, a location of a building the same as the building (or the central office) where the base station 20 is installed or may be a location of a building that is in the vicinity of the building where the base station 20 is installed. The vicinity of the base station 20 is not limited to being physically, geographically close thereto and also includes being temporally close thereto, or being topologically close thereto.

The management apparatus 30 detects positional information regarding the communication terminal 10 and manages this information. The positional information may be, for example, information for identifying the base station 20 with which the communication terminal 10 communicates, or may be a calling area (a paging area) of the communication terminal 10 or a position registration area of the communication terminal 10. The management apparatus 30 transmits the positional information regarding the communication terminal 10 to the control apparatus 60.

The communication apparatus 40 includes a communication function.

The control apparatus 60 instructs the communication apparatus 40 to activate the communication function that the communication apparatus 40 includes. Alternatively, the control apparatus 60 may instruct activation of the communication apparatus 40 itself. The communication function may be referred to as a network function. The control apparatus 60 receives the positional information regarding the communication terminal 10 transmitted from the management apparatus 30. The control apparatus 60 controls start and stop of the communication function included in the communication apparatus 40 based on the received positional information. Alternatively, the control apparatus 60 may control start and stop of the communication apparatus 40 itself based on the positional information. When the communication function that the communication apparatus 40 includes has already been activated, the activated communication apparatus 40 may be appropriated or used. When the control apparatus 60 receives the positional information regarding the communication terminal 10, the control apparatus 60 activates the communication function for performing data transfer between the communication terminal 10 and the server 50 in the communication apparatus 40 that is arranged in the vicinity of or in proximity to the base station 20 to which the communication terminal 10 is connected based on the positional information. In this case, the control apparatus 60 may activate the communication function of the communication apparatus 40 arranged in a location the closest to the communication terminal 10 based on the positional information indicating the location of the communication terminal 10. Alternatively, the communication apparatus 40 arranged in the vicinity of the communication terminal 10 may be a communication apparatus 40 that is located in a location that can satisfy the delay time that the communication service requests in the data transfer between the communication terminal 10 and the server 50. For example, the communication apparatus 40 arranged in the vicinity of the communication terminal 10 may be the communication apparatus 40 that is located adjacent to the base station 20 with which the communication terminal 10 communicates. The location adjacent to the base station 20 may be, for example, a location of a building the same as the building where the base station 20 is installed or may be a location of the building that is in the vicinity of the building where the base station 20 is installed. Further, the control apparatus 60 may stop the communication apparatus 40 when, for example, there is no longer any communication terminal 10 that uses the server 50 or the communication apparatus 40, when a predetermined period of time has passed after there is no longer any communication terminal 10 that uses the server 50 or the communication apparatus 40, or when the number of communication terminals 10 that are being used becomes fewer than a threshold.

The aforementioned communication function includes a gateway function that relays data transmitted/received (transmitted or received) between the communication terminal 10 and the server 50 that provides the service.

As described above, in the communication system shown in FIG. 1, the control apparatus 60 is able to activate the communication function of the communication apparatus 40 arranged in the vicinity of the communication terminal 10 or the base station 20 to which the communication terminal 10 is connected based on the positional information regarding the communication terminal 10. The communication terminal 10 is able to receive the service from the server 50 that is arranged in the vicinity of the base station 20 via the activated communication apparatus 40. It is therefore possible to optimize or improve the efficiency of the transmission route or the transmission path between the communication terminal 10 and the server 50. Further, the transmission time in the data transfer between the communication terminal 10 and the server 50 can be shortened or reduced more than that in the case in which another communication apparatus arranged in a desired location is used. The communication system in which the transmission time is short is efficiently used for the service such as V2X that requires a low latency.

Next, using the communication system shown in FIG. 2, a flow of the user data will be explained. The communication system shown in FIG. 2 includes a communication terminal 10, a base station 20, a management apparatus 30, a control apparatus 60, a local GW 71, a local server 73, an SGW 74, a PGW 76, an external NW 84, and a server 86. The components that are the same as those shown in FIG. 1 are denoted by the same reference symbols, and thus detailed descriptions thereof will be omitted.

The local GW 71 corresponds to the communication apparatus 40 shown in FIG. 1. The local server 73 corresponds to the server 50 shown in FIG. 1. The local GW 71 may be installed in an apparatus the same as the local server 73, and the local GW 71 may be composed of an apparatus other than the local server 73.

The user data may be referred to as User (U)-Plane data. Further, data that is used to construct the communication path of the user data includes control data. The control data may be referred to as Control (C)-Plane data.

The SGW 74 and the PGW 76 are gateway apparatuses that relay the user data. The SGW 74 and the PGW 76 compose a core network. The SGW 74 and the PGW 76 are physical nodes. The external network (external NW) 84 is a network different from a mobile network composed of the base station 20, the SGW 74, and the PGW 76. The external NW 84 may be a Packet Data Network (PDN) or the so-called Internet. The server 86 is a server that is provided on the external NW 84 and provides various services. Further, some of the functions of the server 86 may be transferred to the local server 73 in advance.

The control apparatus 60 controls start or stop of the local GW 71 using the positional information regarding the communication terminal 10 transmitted from the management apparatus 30. Further, the control apparatus 60 may control start or stop of the gateway function of the local GW 71. In the following description, the start or stop includes not only the start or stop of the apparatus itself but also the start or stop of the function that the apparatus includes. The control apparatus 60 specifies, for example, the local GW 71 located in the vicinity of the base station 20 or the local GW 71 that is in proximity to the base station 20, and controls start or stop of the local GW 71 that has been specified. Further, the control apparatus 60 may control start or stop of not only the local GW 71 but also the local server 73 using the positional information transmitted from the management apparatus 30.

The control apparatus 60 may control the start or the stop of at least one of the local GW 71 and the local server 73 based on, besides the positional information regarding the communication terminal 10, the type of the communication terminal 10, the type of the service that has been required, the delay time that the service requires or the like.

Figure 2:
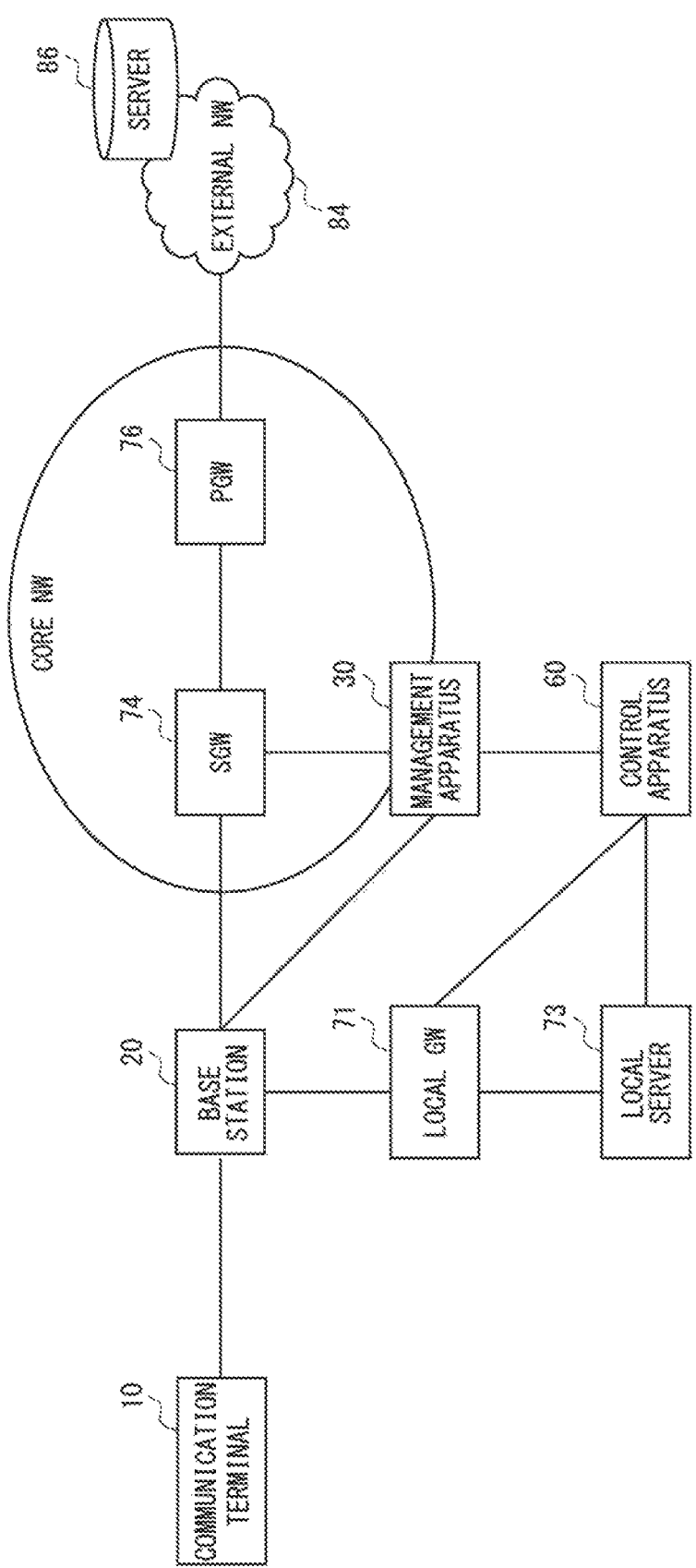
FIG. 2 is a diagram showing a flow of user data in the communication system according to the first embodiment.

In the communication system shown in FIG. 2, the user data transmitted between the communication terminal 10 and the local server 73 passes the base station 20 and the local GW 71. That is, the communication terminal 10 is able to receive the service from the local server 73 arranged in the vicinity of the base station 20 via the activated local GW 71 without passing the SGW 74 and the PGW 76 provided on the side of the core network.

By using the communication system shown in FIG. 2, it is possible to not only obtain the aforementioned effects of the communication system shown in FIG. 1 but also reduce the amount of the traffic flowing into the core network since the user data transmitted between the communication terminal 10 and the local server 73 does not pass the core network. In particular, this communication system is efficiently used for a large amount of data transmission in M2M or IoT.

Furthermore, the communication terminal 10 is capable of receiving a local service such as provision of area information from the local server 73 located in the vicinity of the base station 20.

Further, the control apparatus 60 performs start and stop of the local GW 71 and the local server 73 using the positional information, whereby it is possible to reduce the power consumption in the central office in which the local GW 71 and the local server 73 are arranged.

Further, when the local GW 71 and the local server 73 are activated based on the type of the communication terminal 10, the type of the service that has been required, the delay time that the service requires or the like, the traffic of the service that requires a low latency is made to pass the local GW 71 and the traffic of the service that does not require a low latency is made to pass the core network, whereby it is possible to distribute the load of the traffic.

Second Embodiment

Figure 3:
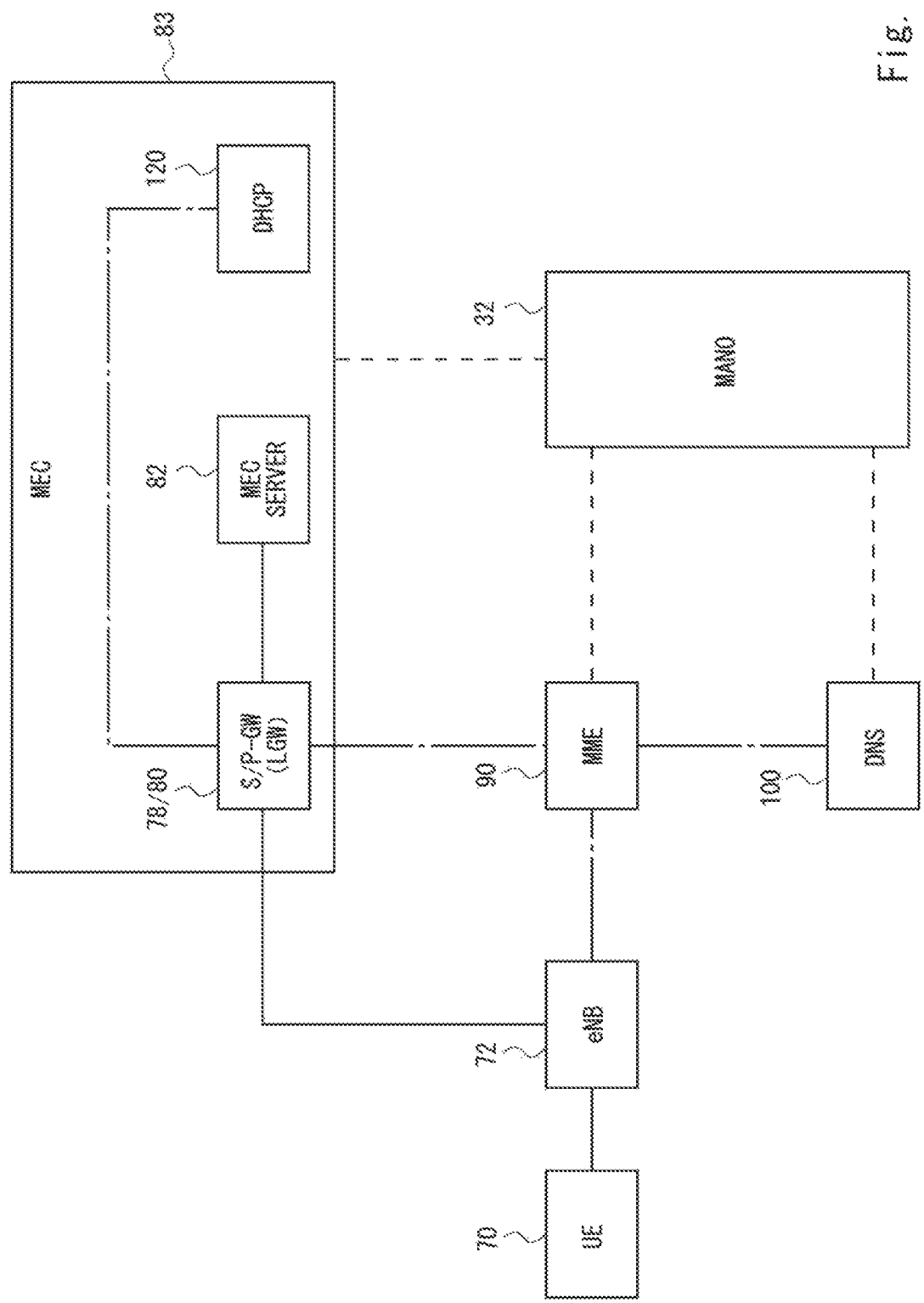
FIG. 3 is a configuration diagram showing a communication system according to a second embodiment.

With reference next to FIG. 3, a configuration example of a communication system according to a second embodiment of the present disclosure will be explained. The communication system shown in FIG. 3 includes a User Equipment (UE) 70, an evolved Node B (eNB) 72, an MEC 83, an MME 90, a Domain Name System (DNS) 100, and a Management And Network Orchestration (MANO) 32. The solid line shown in FIG. 3 indicates the transmission path of the user data, the alternate long and short dash line indicates a transmission path of control data (control plane) defined in the 3GPP, and the dotted line indicates a transmission path of control data other than the control data defined in the 3GPP.

The UE 70, which is a general term for the communication terminal in the 3GPP, corresponds to the communication terminal 10 shown in FIG. 2. The eNB 72, which is a base station that supports the LTE as a radio system, corresponds to the base station 20 shown in FIG. 2. The MME 90, which is a node apparatus defined by the 3GPP, corresponds to the management apparatus 30 shown in FIG. 2. The MANO 32, which is an apparatus configured to control the virtualization system, corresponds to the control apparatus 60 shown in FIG. 2.

The MEC 83 is a system that provides a low-latency service, a local service and the like, and may be referred to as an MEC system. The MEC 83 includes a virtual SGW 78, a virtual PGW 80, an MEC server 82, and a Dynamic Host Configuration Protocol (DHCP) 120. The DHCP 120 may also be referred to as a DHCP server or a DHCP entity. The MEC server 82 corresponds to the server 50 shown in FIG. 2. The virtual SGW 78 and the virtual PGW 80 correspond to the local GW 71 shown in FIG. 2.

The MEC server 82 is a server configured to provide a communication service for the UE 70. The communication service provided by the MEC server 82 may be, for example, a service where an extremely short delay time is required in order to achieve real-time communication. The MEC server 82 may be arranged in the vicinity of the eNB 72 (e.g., a building the same as the building in which the eNB 72 is arranged or a building that is adjacent to the building in which the eNB 72 is arranged) in order to satisfy an extremely short delay time. According to this arrangement, the MEC server 82 is arranged physically close to the UE 70. Therefore, the transmission delay of the data exchanged between the MEC server 82 and the UE 70 can be reduced.

The virtual SGW 78 and the virtual PGW 80 are the SGW function and the PGW function activated by the MANO 32 in the local GW 71. Further, the MANO 32 may activate the virtual Local Gateway (LGW) function in the local GW 71.

The local GW 71 includes physical resources and software resources. For example, the local GW 71 may operate as a virtual network apparatus by activating various network functions using the software resources. The network function may be, for example, a function executed in the Mobility Management Entity (MME), the SGW, the PGW or the like defined in the 3rd Generation Partnership Project (3GPP). Further, the functions executed in the SGW and the PGW may be referred to as a gateway function. For example, the local GW 71 can serve as the MME by activating the function of the MME as the network function in the local GW 71.

The DNS 100 manages the domain name and the IP address of the virtual SGW 78 and those of the virtual PGW 80 in association with one another. Further, the DHCP 120 manages the IP address of the MEC server 82.

Figure 4:
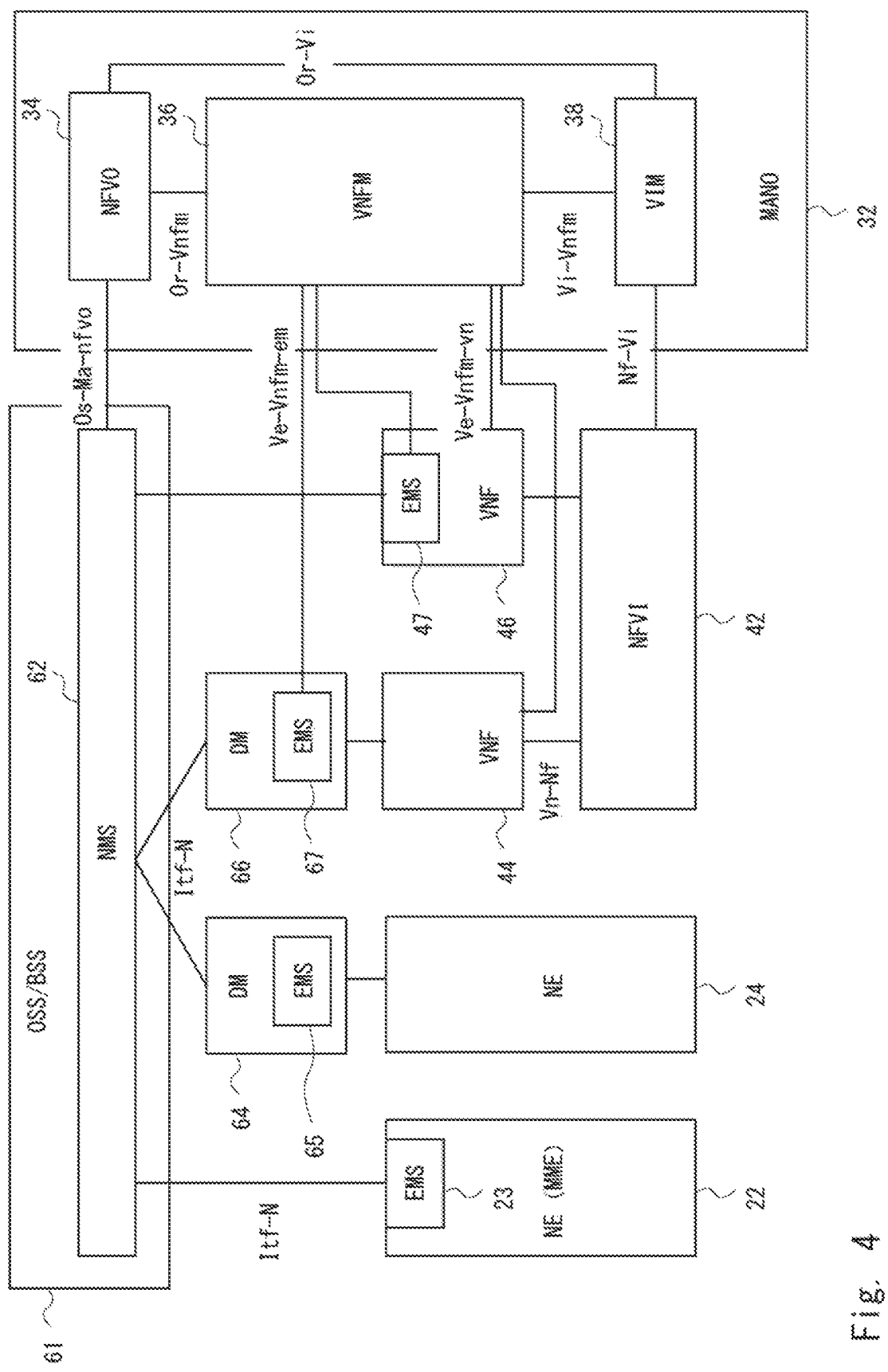
FIG. 4 is a configuration diagram of a virtualization system according to the second embodiment.

With reference next to FIG. 4, a configuration example of a virtualization system according to the second embodiment of the present disclosure will be explained. FIG. 4 mainly shows a configuration of the MANO 32, the virtual SGW 78, the virtual PGW 80, and the MME 90 shown in FIG. 3. The virtualization system shown in FIG. 4 shows a system configuration for achieving Network Function Virtualization (NFV) mainly proposed by the European Telecommunications Standards Institute (ETSI). The virtualization system shown in FIG. 4 includes a Network Element (NE) 22, an NE 24, a Management And Network Orchestration (MANO) 32, an NFV Infrastructure (NFVI) 42, a Virtualized Network Function (VNF) 44, a VNF 46, a Domain Manager (DM) 64, a DM 66, and an Operation Support System (OSS)/Business Support System (BSS) 61.

The NE 22, the DM 64, and the DM 66 respectively include an Element Management System (EMS) 23, an EMS 65, and an EMS 67. The MANO 32 includes an NFV Orchestrator (NFVO) 34, a VNF Manager (VNFM) 36, and a Virtualized Infrastructure Manager (VIM) 38. The OSS/BSS 61 includes a Network Management System (NMS) 62.

The NE 22 and the NE 24 are each, for example, a node apparatus arranged in the mobile network. The NE 22 may be, for example, an MME that is defined by the 3GPP. The NE 24 may be an SGW, a PGW or the like defined by the 3GPP. The NE, which is the MME, corresponds to the management apparatus 30 shown in FIG. 2. Further, the NE 22 and the NE 24 are each a physical node.

The VNF 44 and the VNF 46 are software resources for activating or providing the network function used in the mobile network. The NFVI 42 is physical resources for executing the VNF. The apparatus composed of the NFVI 42, the VNF 44, and the VNF 46 corresponds to the local GW 71 shown in FIG. 2, and corresponds to the S/P-GW (LGW) 78/80 shown in FIG. 3. This may be referred to as a Virtual Machine (VM).

The OSS/BSS 61 is a system that manages the whole virtualization system using the NMS 62. The DM 64 and the DM 66, which are arranged for each domain, manage the apparatus that composes the domain.

The EMS 23 is a function that manages the NE 22. In a similar way, the EMS 65 is a function that manages the DM 64 and the EMS 67 is a function that manages the DM 66.

The MANO 32 controls the virtualization system using the NFVO 34, the VNFM 36, and the VIM 38. The MANO 32 may either be apparatuses that include a plurality of servers or be one server apparatus. The MANO 32 corresponds to the control apparatus 60 shown in FIG. 2. The NFVO 34 is connected to the NMS 62 and controls the resources or the operation of the whole virtualization system.

The VNFM 36 is connected to the DM 66, the VNF 44, and the VNF 46, and mainly performs control for activating the network function in the VNF 44 and the VNF 46. The VNFM 36 selects, for example, the network functions activated in the VNF 44 and the VNF 46. Furthermore, the VNFM 36 transmits a message for instructing activation of the network function that has been selected to the VNF 44 and the VNF 46. The VIM 38 controls the NFVI 42.

Now, reference points between components forming the virtualization system in FIG. 4 will be explained. The reference point between the EMS 23 and the NMS 62 is defined to be Itf-N. The reference point between the DM 64 and the DM 66, and the NMS 62 is defined to be Itf-N. The reference point between the VNF 44 and the NFVI 42 is defined to be Vn-Nf. The reference point between the NMS 62 and the NFVO 34 is defined to be Os-Ma-nfvo. The reference point between the EMS 67 and the VNFM 36 is defined to be Ve-Vnfm-em. The reference point between the VNF 46 and the VNFM 36 is defined to be Ve-Vnfm-vn. The reference point between the NFVI 42 and the VIM 38 is defined to be Nf-Vi. The reference point between the NFVO 34 and the VNFM 36 is defined to be Or-Vnfm. The reference point between the VNFM 36 and the VIM 38 is defined to be Vi-Vnfm. The reference point between the NFVO 34 and the VIM 38 is defined to be Or-Vi.

The NFVO 34 receives the positional information regarding the UE 70 from the NE 22 that serves as the MME via the NMS 62. The NFVO 34 outputs the positional information regarding the UE 70 to the VNFM 36.

The positional information regarding the UE 70 may be, for example, the eNB ID that indicates identification information of the eNB 72 with which the UE 70 communicates. Alternatively, the positional information regarding the UE 70 may be, for example, a Tracking Area Code (TAC) that indicates a position registration area or a paging area of the UE 70.

The VNFM 36 selects the VNF 44 and the VNF 46 included in the local GW 71 arranged in the vicinity of the UE 70 using the eNB ID or the TAC. The VNFM 36 instructs to activate the virtual SGW 78 in the VNF 44 that has been selected and instructs to activate the virtual PGW 80 in the VNF 46 that has been selected.

The VNFM 36 may manage, for example, the eNB ID or the TAC, the VNF 44, and the VNF 46 in association with one another. In this case, when the VNFM 36 has received the eNB ID or the TAC, the VNFM 36 instructs the VNF 44 and the VNF 46 associated with the eNB ID or the TAC that has been received to activate the virtual SGW 78 and the virtual PGW 80.

The virtual SGW 78 and the virtual PGW 80 are activated in the local GW 71 arranged in the vicinity of the UE 70, that is, in the vicinity of the eNB 72, thereby being able to minimize the communication path between the UE 70 and the MEC server 82. That is, compared to a case in which the UE 70 uses desired SGW and PGW to communicate with the MEC server 82, the transmission delay between the UE 70 and the MEC server 82 can be reduced in the case in which the virtual SGW 78 and the virtual PGW 80 are used.

Figure 5:
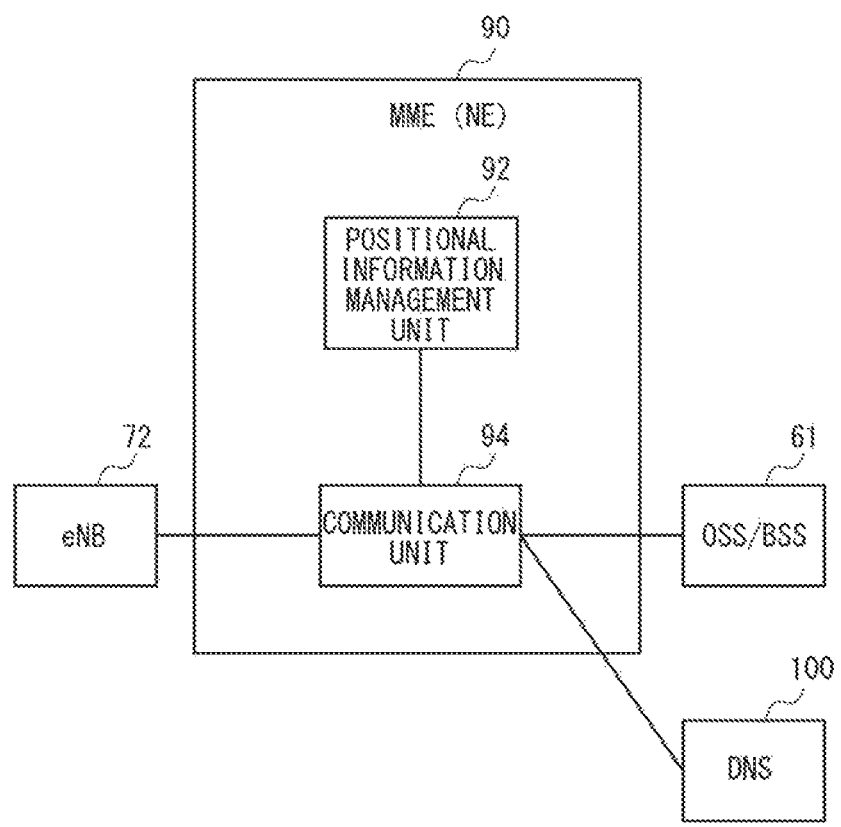
FIG. 5 is a configuration diagram of an MME according to the second embodiment.

With reference next to FIG. 5, a configuration example of the MME 90 will be explained. The MME 90 is the same as the NE 22 described with reference to FIG. 4. The NE 22 is a term that is used in the virtualization system and the MME 90 is a term that is used in the communication system defined in the 3GPP. In this example, the MME 90 and the NE 22 indicate one apparatus.

The MME 90 includes a positional information management unit 92 and a communication unit 94. The communication unit may also be referred to as a transmission/reception unit. The positional information management unit 92 and the communication unit 94 may either be software or a module that is operated by a processor executing a program stored in a memory. Alternatively, the positional information management unit 92 and the communication unit 94 may be hardware such as a circuit or a chip.

The positional information management unit 92 manages information regarding the plurality of UEs located in the position registration area managed by the MME 90. The communication unit 94 transmits a message including positional information in which the UE managed in the positional information management unit 92 and the position registration area managed by the MME 90 are associated with each other to the MANO 32 via the OSS/BSS 61.

Further, the communication unit 94 transmits a message for requesting activation of the virtual SGW 78 and the virtual PGW 80 to the MANO 32 via the OSS/BSS 61. The message that includes the positional information may be the same as the message for requesting activation of the virtual SGW 78 and the virtual PGW 80. Further, the communication unit 94 transmits the message to the DNS 100 in order to acquire address information regarding the virtual SGW 78 and the virtual PGW 80. The DNS 100 may also be referred to as a DNS server 100. The address information regarding the virtual SGW 78 and the virtual PGW 80 may be, for example, an IP address.

Figure 6:
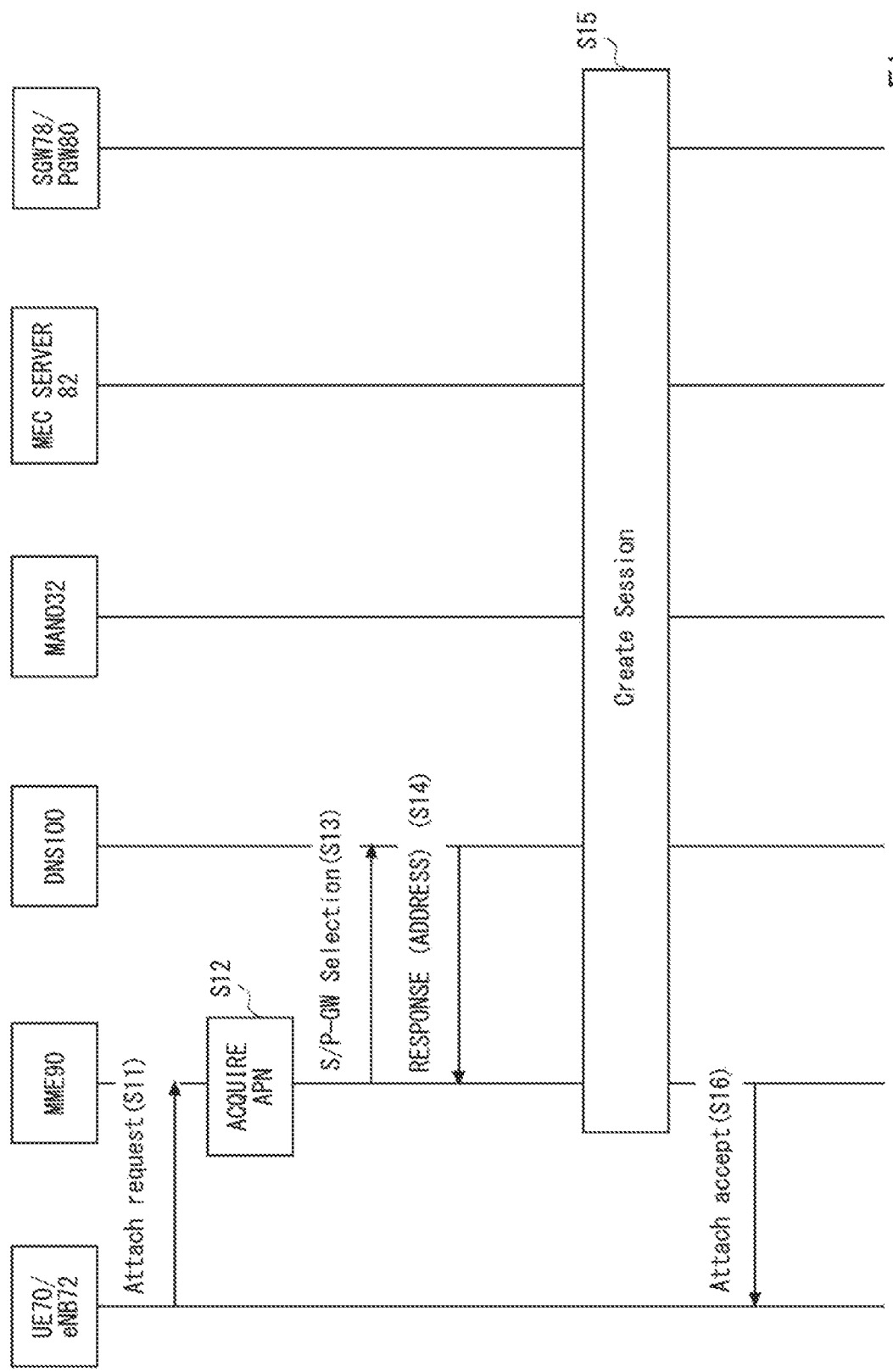
FIG. 6 is a diagram showing one example of a flow of Attach processing regarding a UE according to the second embodiment.

With reference next to FIG. 6, a flow of Attach processing regarding the UE 70 will be explained. First, the UE 70 transmits an Attach request message to the MME 90 via the eNB 72 (S11). The UE 70 transmits the Attach request message including an Access Point Name (APN) regarding the MEC service to the MME 90.

Next, the MME 90 determines whether the APN included in the Attach request message is an APN regarding the MEC service (S12). While the MME 90 determines whether it is allowed to use the MEC service in the UE 70 using the APN in Step S12, the MME 90 may determine whether it is allowed to use the MEC service in the UE 70 using, for example, a subscriber profile of the UE 70. The MME 90 may perform the aforementioned determination using, for example, the subscriber profile held in a Home Subscriber Server (HSS: not shown). Alternatively, the MME 90 may determine whether it is allowed to use the MEC service in the UE 70 using information indicating whether International Mobile Equipment identity (IMEI) or International Mobile Subscriber Identity (IMSI) of the UE 70 is included in an IMEI range or an IMSI range indicating an IMEI group or an IMSI group that uses the MEC service. In Step S12, the MME 90 determines that the UE 70 uses the MEC service.

Next, the MME 90 transmits an S/P-GW Selection message to the DNS 100 in order to acquire the address information regarding the virtual SGW 78 and the virtual PGW 80 to communicate with the MEC server 82 that provides the MEC service (S13).

Next, the DNS 100 searches for the addresses of the virtual SGW 78 and the virtual PGW 80. When the DNS 100 has found the addresses of the virtual SGW 78 and the virtual PGW 80, the DNS 100 transmits a response message including the address information regarding the virtual SGW 78 and the virtual PGW 80 to the MME 90 (S14). Accordingly, the UE 70 is able to perform communication by appropriating or using the virtual SGW 78 and the virtual PGW 80 that have already been activated. Next, the MME 90 executes processing for establishing the session between the eNB 72 and the virtual SGW 78 and further the session between the virtual SGW 78 and the virtual PGW 80 (S15). The session between the eNB 72 and the virtual SGW 78 and the session between the virtual SGW 78 and the virtual PGW 80 may also be called a Packet Data Network (PDN) Connection or a communication bearer. Next, the MME 90 transmits the Attach accept message to the UE 70 via the eNB 72 as a response to the Attach request message in Step S11 (S16).

By executing the processing of FIG. 6, in the Attach processing of the UE 70, the UE 70 is able to communicate with the MEC server 82 via the virtual SGW 78 and the virtual PGW 80.

Figure 7:
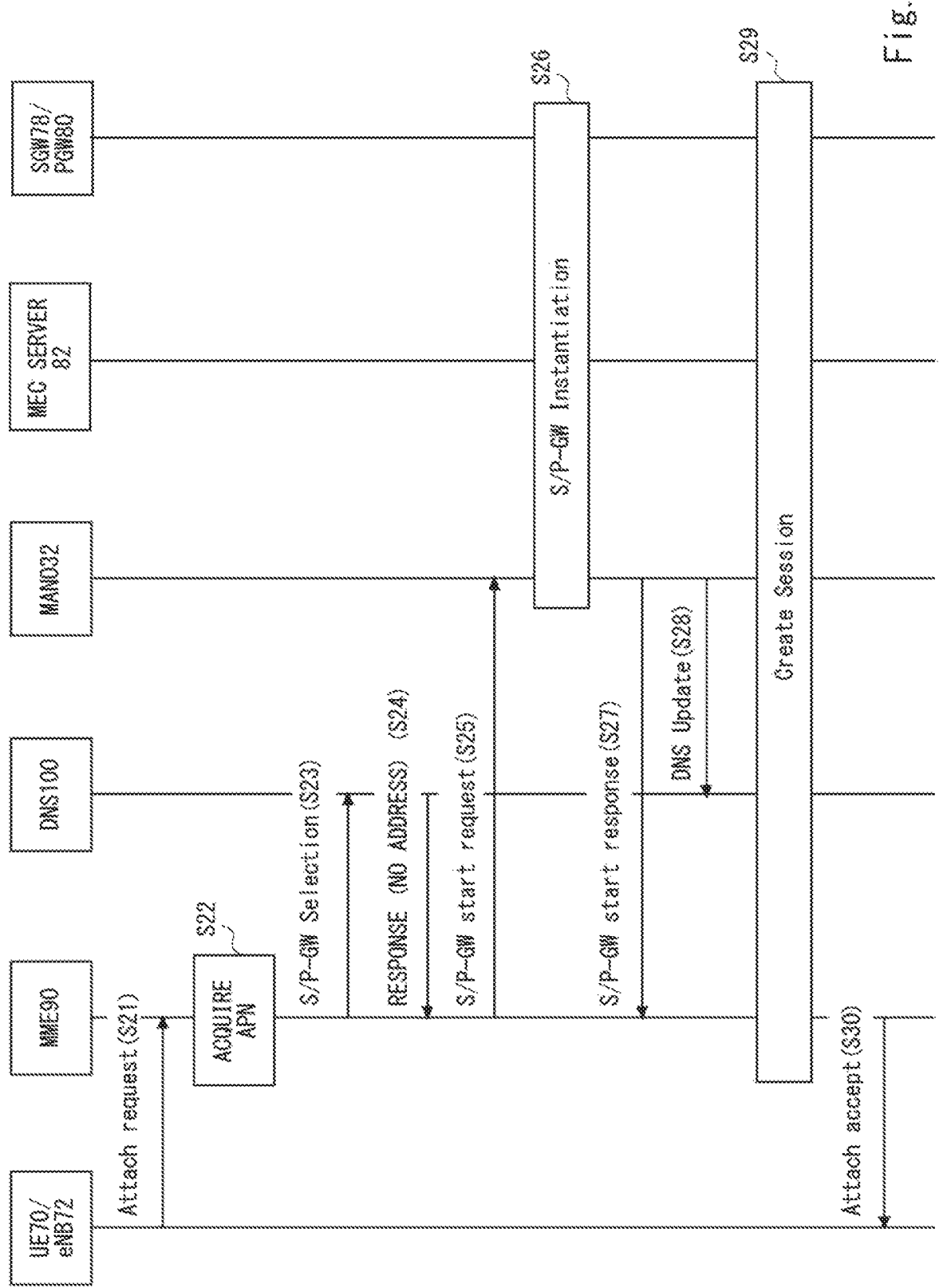
FIG. 7 is a diagram showing another example of the flow of the Attach processing regarding the UE according to the second embodiment.

With reference next to FIG. 7, a flow of the Attach processing regarding the UE 70 different from that shown in FIG. 6 will be explained. While it is assumed in FIG. 6 that the DNS 100 has managed the address information regarding the virtual SGW 78 and the virtual PGW 80, it is assumed in FIG. 7 that the DNS 100 does not manage the address information regarding the virtual SGW 78 and the virtual PGW 80. Since Steps S21-S23 shown in FIG. 7 are similar to Steps S11-S13 in FIG. 6, descriptions thereof will be omitted.

When the DNS 100 does not manage the address information regarding the virtual SGW 78 and the virtual PGW 80 to communicate with the MEC server 82 that provides the MEC service in Step S24, the DNS 100 transmits a response message to the MME 90 without configuring the address information regarding the virtual SGW 78 and the virtual PGW 80.

Next, the MME 90 transmits an S/P-GW start request message in which the positional information regarding the UE 70 has been configured to the MANO 32 (S25). Further, the MME 90 may configure, besides the positional information regarding the UE 70, information regarding the type of the MEC service that the UE 70 receives, the quality and the like required for the MEC service in the S/P-GW start request message. Further, the MME 90 may configure, besides the aforementioned positional information regarding the UE 70, information regarding the location where the local GW 71 is installed, in the S/P-GW start request. Further, when the virtual LGW is activated, the S/P-GW start request may be replaced by an L-GW start request message.

Next, the MANO 32 executes S/P-GW instantiation (S26). The S/P-GW instantiation is processing for activating the virtual SGW 78 and the virtual PGW 80 in the VNF included in the local GW 71 arranged in the vicinity of the UE 70, using the positional information regarding the UE 70 transmitted from the MME 90. Further, when the virtual LGW is activated, the S/P-GW instantiation may be replaced by an L-GW instantiation message.

Next, the MANO 32 transmits an S/P-GW start response message in which the address information regarding the virtual SGW 78 and the virtual PGW 80 that have been activated has been configured to the MME 90 (S27). Further, when the virtual LGW is activated, the S/P-GW start response may be replaced by an L-GW start response message. Further, the MANO 32 transmits a DNS Update message in which the address information regarding the virtual SGW 78 and the virtual PGW 80 that have been activated has been configured to the DNS 100 (S28).

Since Steps S29 and S30 are similar to Steps S15 and S16 in FIG. 6, detailed descriptions thereof will be omitted.

As described above, by using the communication system according to the second embodiment of the present disclosure, the local GW 71 arranged in the vicinity of the UE 70 is able to activate the virtual SGW 78 and the virtual PGW 80. Further, when the UE 70 performs communication with the MEC server 82, the user data is exchanged between the UE 70 and the MEC server 82 via the virtual SGW 78 and the virtual PGW 80. Accordingly, the transmission delay of the user data exchanged between the UE 70 and the MEC server 82 can be reduced more than that in the case in which the SGW and the PGW that are in desired places are used. Accordingly, the MEC server 82 that is arranged in a location in the vicinity of the UE 70 such as in the vicinity of the eNB 72 is able to provide a communication service that requires a short delay time for the UE 70.

Third Embodiment

Figure 8:
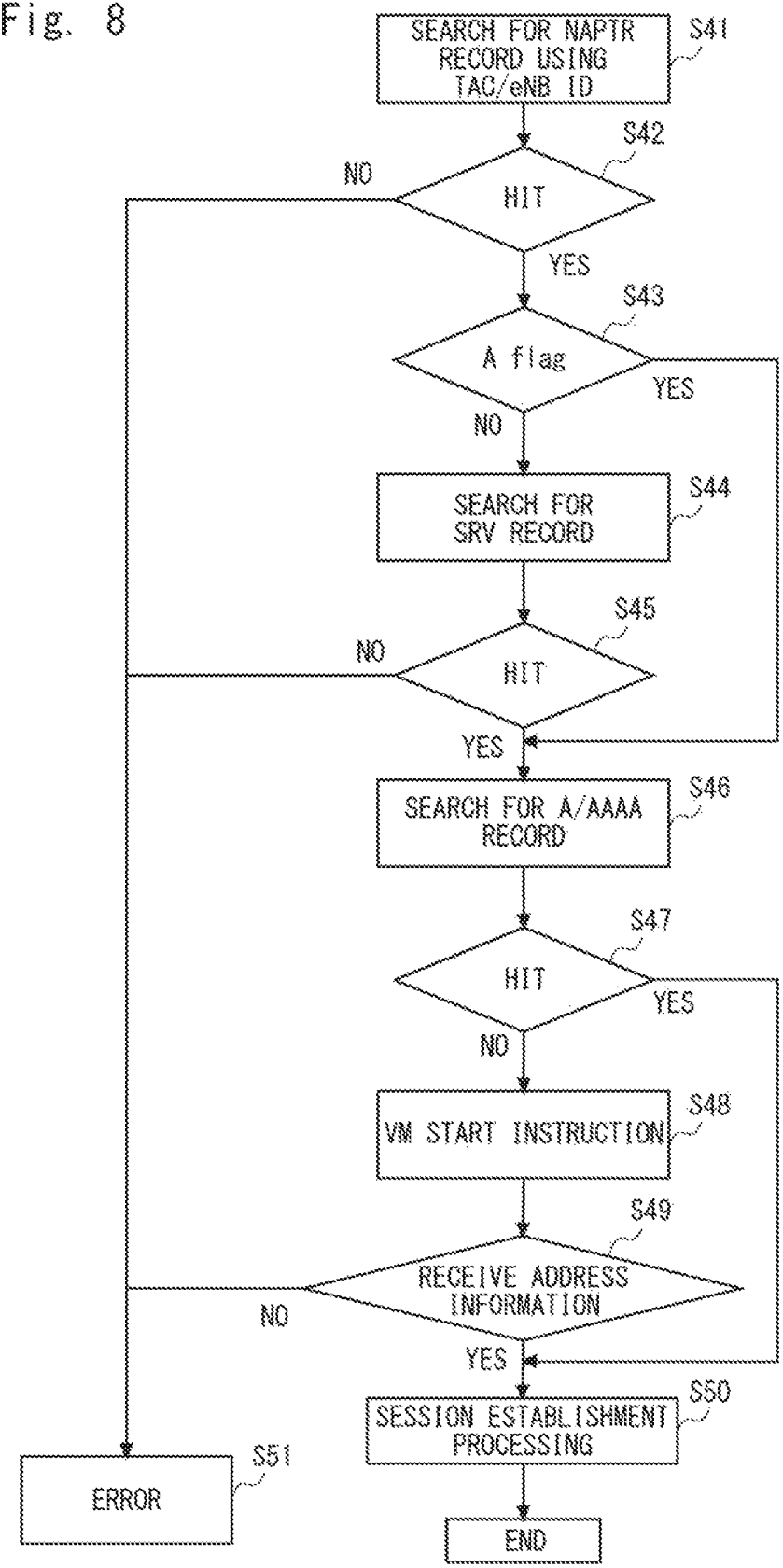
FIG. 8 is a diagram showing a flow of a virtual SGW and a virtual PGW according to a third embodiment.

With reference next to FIG. 8, a flow of processing of activating the virtual SGW 78 and the virtual PGW 80 according to the third embodiment of the present disclosure will be explained. In the third embodiment, the following preconditions are set;

(1) Naming Authority Pointer (NAPTR)/Service (SRV) record of the virtual SGW 78 and the virtual PGW 80 for the MEC server 82 is registered in the DNS 100;

(2) A/AAAA record is not registered in the DNS 100; and (3) the MANO 32 obtains the positional information from a Fully Qualified Domain Name (FQDN) obtained from the registered record.

Regarding the precondition (3), if, for example, the FQDN is "topon.s5-sgw.Node1.MecSite1.xxxx", "MecSite1.xxxx" is the positional information regarding the MEC server 82. Further, it is indicated that the name of the virtual SGW used when it communicates with the MEC server 82 is Node1. Therefore, the MME 90 requests activation of the virtual SGW named Node 1.

In the following description, a flow of processing shown in FIG. 8 will be explained. First, the MME 90 searches for the NAPTR record associated with the TAC or the eNB ID regarding the UE 70 using the DNS 100 (S41). Next, the MME 90 determines whether the NAPTR record has been hit (S42). When the MME 90 determines that the NAPTR record has been hit, the MME 90 determines whether an A flag has been configured in the NAPTR record (S43).

When it has been determined that the A flag has not been configured in the NAPTR record and an S flag is, for example, configured therein, the MME 90 searches for the SRV record (S44). Next, the MME 90 determines whether the SRV record has been hit (S45). When it is determined that the SRV record has been hit, the MME 90 searches for the A/AAAA record (S46). The SRV that has been hit may be indicated by, for example, "topon.s5-sgw.Node1.MecSite1.xxxx" using the FQDN.

When it is determined that the A flag has been configured in the NAPTR record in Step S43, the MME 90 does not perform processing of Steps S44 and S45 and executes processing of Step S46.

Next, when it has been determined that the A/AAAA record has not been hit (S47), the MME 90 transmits a message regarding a Virtual Machine (VM) start instruction to the MANO 32 (S48). The VM corresponds to the local GW 71 described with reference to FIG. 2, and further corresponds to the NFVI 42, the VNF 44, and the VNF 46 described with reference to FIG. 4. The VM start instruction is a message for instructing to activate the virtual SGW 78 and the virtual PGW 80 in the VNF 44 and the VNF 46. The message regarding the VM start instruction corresponds to, for example, the S/P-GW start request message in Step S25 in FIG. 7. The MME 90 instructs to activate the virtual SGW 78, which is set as a Node1, in the message regarding the start instruction. Further, when the address of the virtual PGW 80 is indicated in the SRV record that has been hit in Step S45, the MME 90 also instructs activation of the virtual PGW 80 as well.

Next, the MME 90 determines whether it has received the address information regarding the virtual SGW 78 and the virtual PGW 80 that have been activated (S49). When it has been determined that the address information regarding the virtual SGW 78 and the virtual PGW 80 that have been activated has not been received, MME 90 determines that an error has occurred (S51). Further, when the MME 90 has received the address information regarding the virtual SGW 78 and the virtual PGW 80 that have been activated, the MME 90 executes session establishment processing in the eNB 72, the virtual SGW 78, and the virtual PGW 80 (S50). The session establishment processing corresponds to Step S29 shown in FIG. 7.

When it has been determined that the A/AAAA record has been hit in Step S47, the MME 90 executes the session establishment processing in Step S50. Further, when it has been determined that the A/AAAA record has not been hit in Steps S42 and S45, it is determined in Step S51 that an error has occurred.

As described above, when the flow of processing of activating the virtual SGW 78 and the virtual PGW 80 according to the third embodiment of the present disclosure is used, the positional information regarding the virtual SGW 78 and the virtual PGW 80 can be managed using the address information hierarchically named. The MME 90 is able to request the MANO 32 to activate the virtual SGW 78 and the virtual PGW 80 used when it communicates with the MEC server 82 using the address information hierarchically named.

Fourth Embodiment

Figure 9:
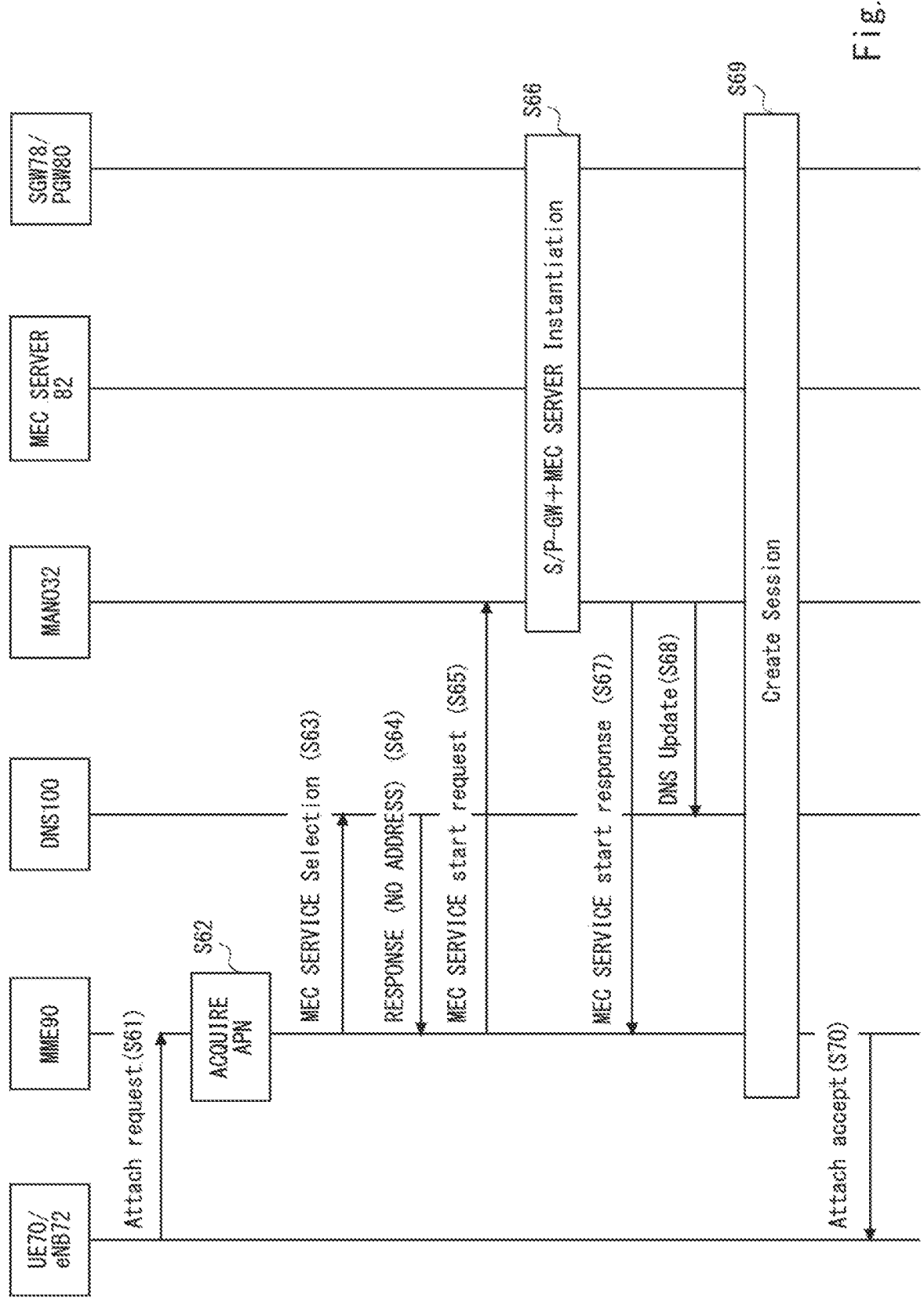
FIG. 9 is a diagram showing a flow of Attach processing regarding a UE according to a fourth embodiment.

With reference next to FIG. 9, a flow of Attach processing regarding the UE 70 according to a fourth embodiment of the present disclosure will be explained. Since Steps S61 and S62 are the same as Steps S11 and S12 in FIG. 6, detailed descriptions thereof will be omitted. Next, the MME 90 transmits an MEC service Selection message to the DNS 100 in order to acquire address information regarding the MEC server 82 that provides the MEC service and address information regarding the virtual SGW 78 and the virtual PGW 80 to communicate with the MEC server 82 that provides the MEC service (S63).

Next, when the DNS 100 does not manage the address information regarding the MEC server 82 that provides the MEC service and the address information regarding the virtual SGW 78 and the virtual PGW 80 to communicate with the MEC server 82 that provides the MEC service, the DNS 100 transmits a response message to the MME 90 without configuring the respective address information (S64).

Next, the MME 90 transmits an MEC service start request message in which the positional information regarding the UE 70 has been configured to the MANO 32 (S65). Next, the MANO 32 executes the S/P-GW and the MEC server instantiation (S66). That is, the MANO 32 activates the MEC server 82 and activates the virtual SGW 78 and the virtual PGW 80 in the VNF that the local GW 71 arranged in the vicinity of the UE 70 includes.

With reference now to FIG. 10, information in which the positional information regarding the UE 70 held by the MANO 32 and the MEC server are associated with each other will be explained. While the TAC is used as the positional information regarding the UE 70 in FIG. 10, an eNB ID may instead be used.

In FIG. 10, the TAC and the MEC server are associated one-to-one with each other. When, for example, the MANO 32 has acquired TAC:0001 as the positional information regarding the UE 70, the MANO 32 activates the MEC server 82, which is set as MEC001.

Referring back to FIG. 9, next, the MANO 32 transmits an MEC service start response message in which the address information regarding the MEC server 82, the virtual SGW 78, and the virtual PGW 80 that have been activated has been configured to the MME 90 (S67). Further, the MANO 32 transmits a DNS Update message in which the address information regarding the MEC server 82, the virtual SGW 78, and the virtual PGW 80 that have been activated has been configured to the DNS 100 (S68).

Since Step S69 is similar to Step S15 shown in FIG. 6, detailed descriptions thereof will be omitted. Next, the MME 90 transmits an Attach accept message in which the address information regarding the MEC server 82 acquired in Step S67 has been configured to the UE 70 via the eNB 72 (S70). The MME 90 may configure the address information regarding the MEC server 82 in a Protocol Configuration Option (PCO), which is an information element used when it directly exchanges information with the UE 70. After the Attach accept message is transmitted to the UE 70, MEC service initialization processing is executed.

As described above, by executing the flow of processing regarding the activation of the virtual SGW 78 and the virtual PGW 80 according to the fourth embodiment of the present disclosure, the MME 90 is able to request, besides activation of the virtual SGW 78 and the virtual PGW 80, activation of the MEC server 82 as well. Further, the UE 70 is able to acquire the address information regarding the MEC server 82 in the procedure of the Attach processing.

Fifth Embodiment

Figure 11:
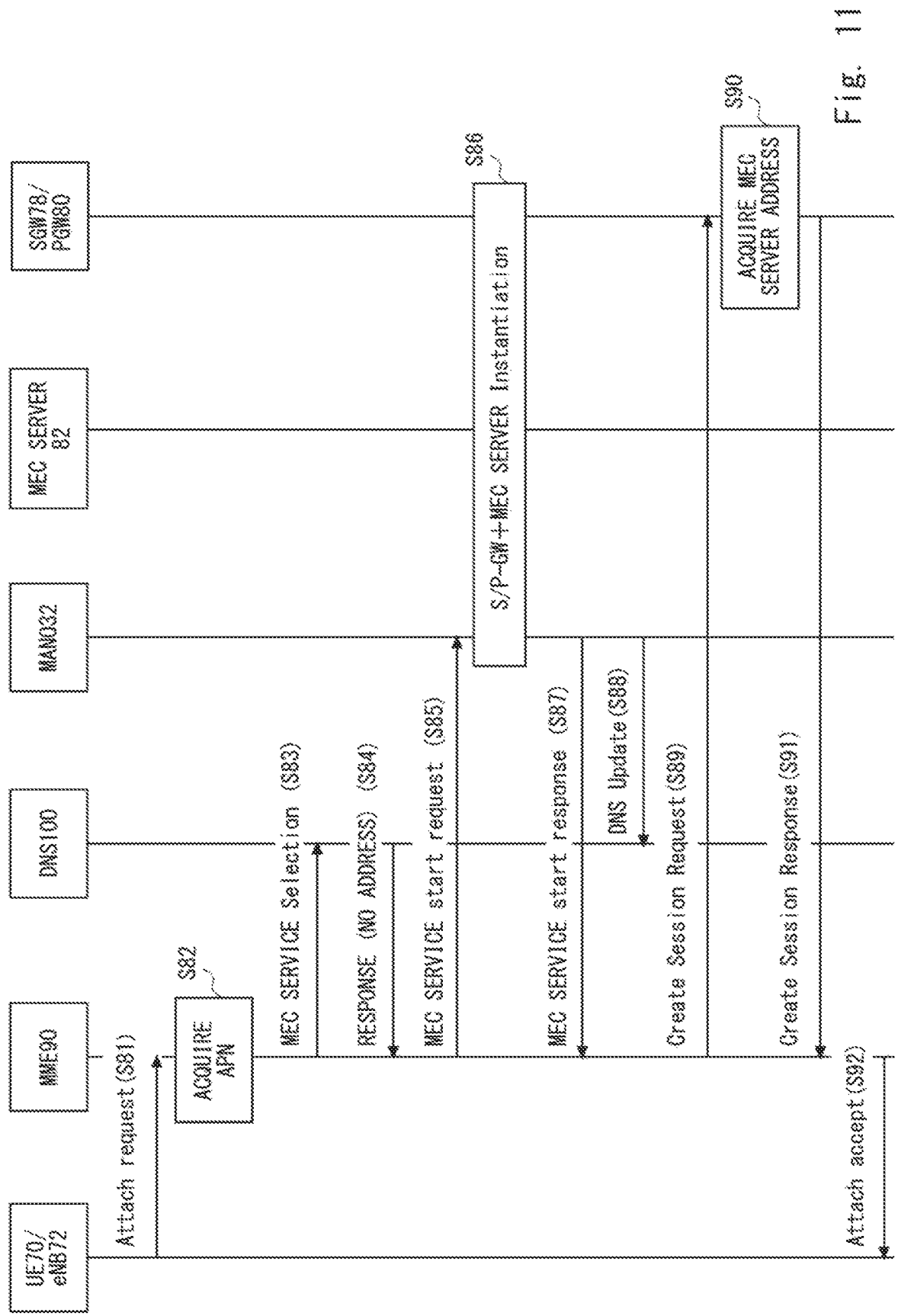
FIG. 11 is a diagram showing a flow of Attach processing regarding a UE according to a fifth embodiment.

With reference next to FIG. 11, a flow of Attach processing regarding the UE 70 according to a fifth embodiment of the present disclosure will be explained. Since Steps S81-S86 are similar to Steps S61-S66 in FIG. 9, detailed descriptions thereof will be omitted.

When the MEC server 82, the virtual SGW 78, and the virtual PGW 80 are activated in Step S86, the MANO 32 transmits an MEC service start response message in which the address information regarding the virtual SGW 78 and the virtual PGW 80 has been configured to the MME 90 (S87). Next, the MANO 32 transmits a DNS Update message in which the address information regarding the MEC server 82, the virtual SGW 78, and the virtual PGW 80 has been configured to the DNS 100 (S88).

Next, the MME 90 transmits a Create Session Request message to the virtual SGW 78 and the virtual PGW 80, and establishes the session among the eNB 72, the virtual SGW 78, and the virtual PGW 80 (S89). The MME 90 configures information for requesting the address information regarding the MEC server 82 in the Create Session Request message.

Next, the virtual PGW 80 acquires address information regarding the MEC server 82 (S90). Now, a method in which the virtual PGW 80 acquires the address information regarding the MEC server 82 will be explained. When, for example, the virtual PGW 80 is activated, the VNFM 36 may transmit the address information regarding the MEC server 82 to the virtual PGW 80 as station data or may populate the virtual PGW 80 with the address information regarding the MEC server 82 as station data.

Alternatively, when the virtual PGW 80 is activated, the virtual PGW 80 transmits a DHCP request to the DHCP server that manages the IP address of the MEC server 82. The virtual PGW 80 may acquire the IP address of the MEC server 82 in a message in response to the DHCP request.

Alternatively, when the virtual PGW 80 is activated, virtual PGW 80 transmits an inquiry message that includes the domain name of the MEC server 82 to the DNS server that manages the IP address of the MEC server 82. The virtual PGW 80 may acquire the IP address of the MEC server 82 in a message in response to the inquiry message.

When the virtual PGW 80 acquires the address information regarding the MEC server 82, the virtual PGW 80 transmits a Create Session Response message in which the acquired address information has been configured to the MME 90 (S91). Next, the MME 90 transmits an Attach accept message in which the address information regarding the MEC server 82 has been configured to the UE 70 via the eNB 72 (S92). In Step S91, the virtual PGW 80 may configure the address information regarding the MEC server 82 in a Protocol Configuration Option (PCO), which is an information element used when it directly exchanges information with the UE 70. Further, in Step S92, the MME 90 may configure the address information regarding the MEC server 82 in a Protocol Configuration Option (PCO), which is an information element used when it directly exchanges information with the UE 70. After the Attach accept message is transmitted to the UE 70, the MEC service initialization processing is executed.

As described above, by executing the flow of processing regarding the activation of the virtual SGW 78 and the virtual PGW 80 according to the fifth embodiment of the present disclosure, the MME 90 is able to request, besides activation of the virtual SGW 78 and the virtual PGW 80, activation of the MEC server 82 as well. Further, the virtual PGW 80 is able to acquire the address information regarding the MEC server 82, and the virtual PGW 80 is able to transmit the address information regarding the MEC server 82 to the UE 70 in the procedure of the Attach processing regarding the UE 70.

Sixth Embodiment

Figure 12:
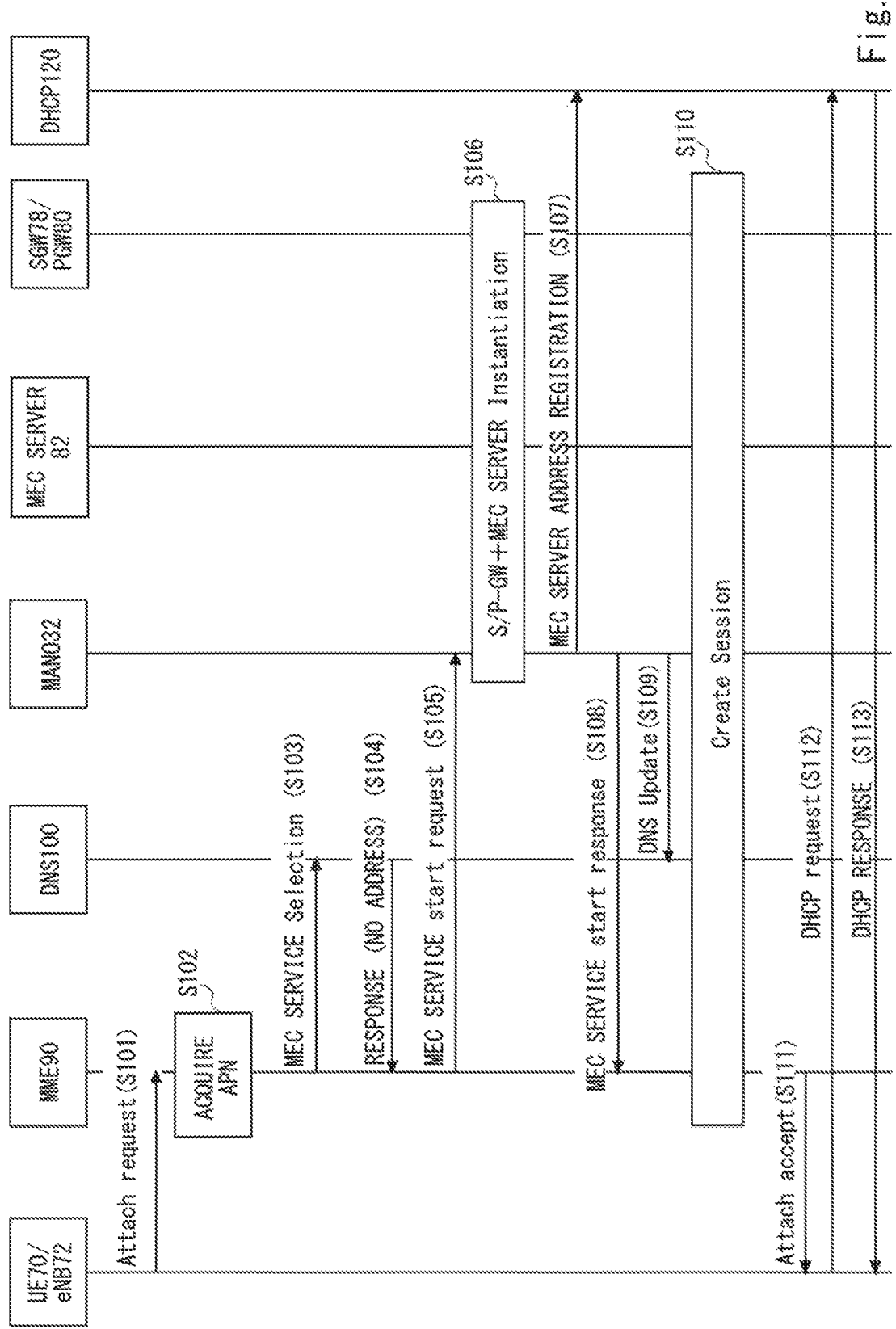
FIG. 12 is a diagram showing a flow of Attach processing regarding a UE according to a sixth embodiment.

With reference next to FIG. 12, a flow of Attach processing regarding the UE 70 according to a sixth embodiment of the present disclosure will be explained. Since Steps S101-S106 are similar to Steps S61-S66 in FIG. 9, detailed descriptions thereof will be omitted.

The MANO 32 transmits a message for requesting registration of the address information regarding the MEC server 82 to the DHCP server 120 (S107). Since Steps S108-S110 are similar to Steps S67-S69 in FIG. 9, detailed descriptions thereof will be omitted.

The MME 90 transmits an Attach accept message to the UE 70 via the eNB 72 in Step S111. The MME 90 has not configured the address information regarding the MEC server 82 in the Attach accept message. After the Attach accept message is transmitted to the UE 70, the MEC service initialization processing is executed.

Next, the UE 70 transmits a DHCP request message to the DHCP server 120 in order to acquire the address information regarding the MEC server 82 (S112). The DHCP server 120 transmits a DHCP response message in which the address information regarding the MEC server 82 has been configured to the UE 70 (S113).

As described above, by executing the flow of processing regarding activation of the virtual SGW 78 and the virtual PGW 80 according to the sixth embodiment of the present disclosure, the MME 90 may request, besides activation of the virtual SGW 78 and the virtual PGW 80, activation of the MEC server 82 as well. Further, since the MANO 32 registers the address information regarding the MEC server 82 in the DHCP server 120, the UE 70 is able to acquire the address information regarding the MEC server 82 by receiving the DHCP response message.

Seventh Embodiment

Figure 13:
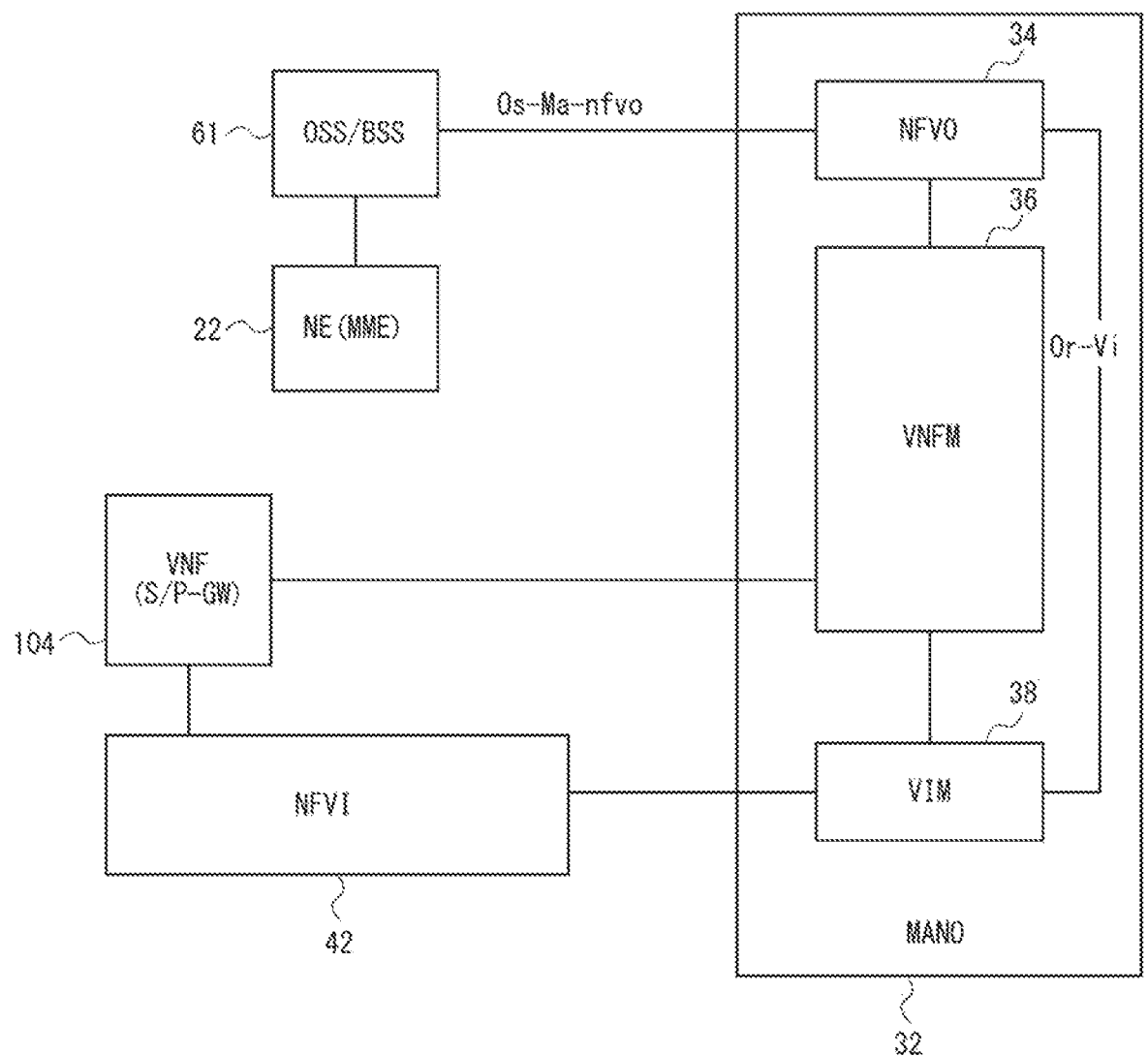
FIG. 13 is a diagram showing a connection form between an MME and a MANO according to a seventh embodiment.

Next, as a Modified Example of the connection form between the MME and the MANO, a configuration example of the virtualization system in which FIG. 4 is simplified will be explained with reference to FIG. 13. In FIG. 13, the NE 22 corresponds to the MME. Further, a VNF (S/P-GW) 104 indicates that it is a VNF in which the SGW function and the PGW function have been activated by the VNFM 36.

While the MME is shown to be a physical node in FIG. 13, it may be activated as software in the VNF, similar to the VNF (S/P-GW) 104.

Figure 14:
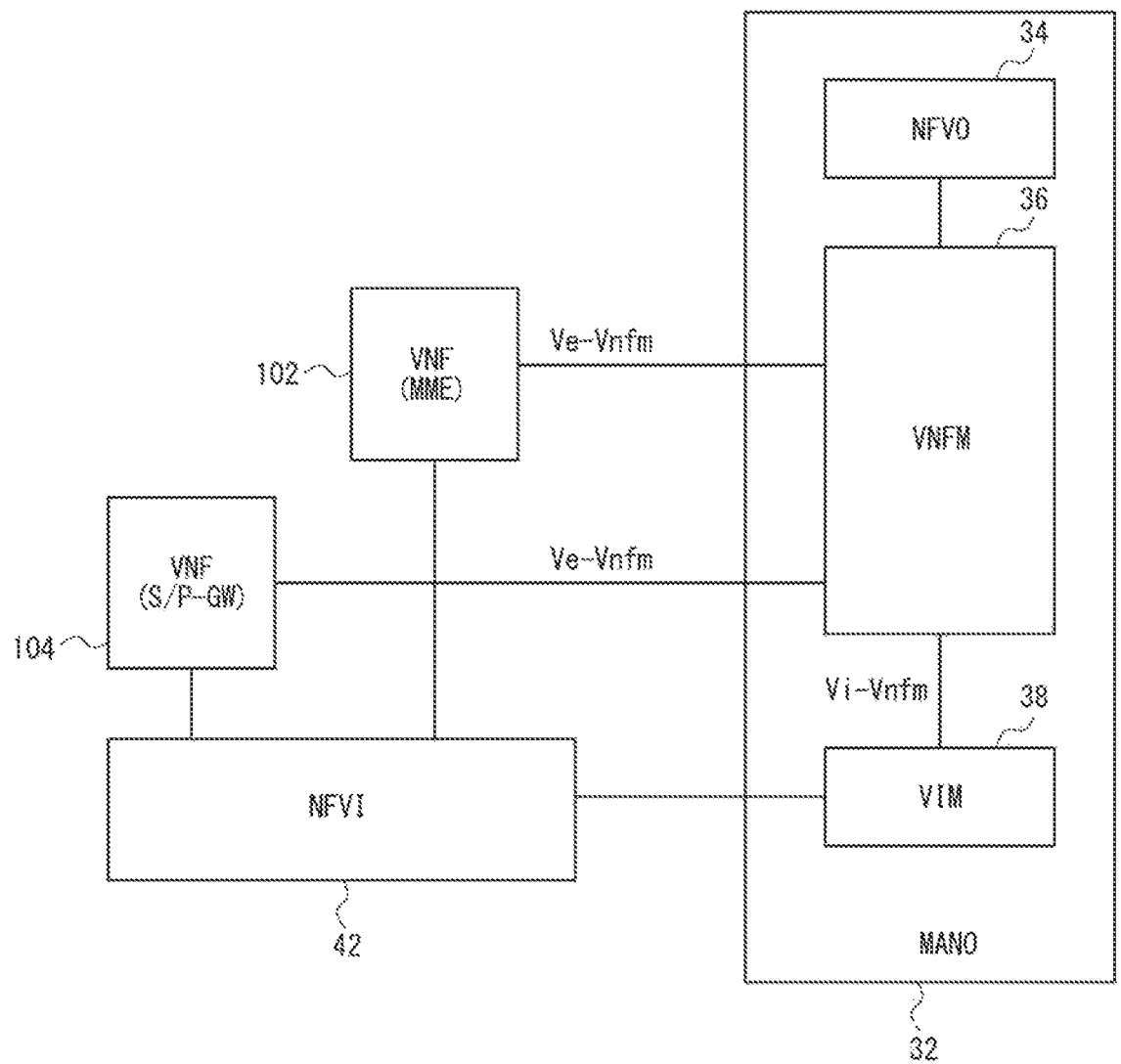
FIG. 14 is a diagram showing Modified Example 1 of the connection form between the MME and the MANO according to the seventh embodiment.

With reference next to FIG. 14, a connection form between the MME and the MANO different from that shown in FIG. 13 will be explained as a modified example of FIG. 13.

FIG. 14 shows that a VNF (MME) 102 is a VNF in which the MME function is activated by the VNFM 36. Further, FIG. 14 shows that the VNF (S/P-GW) 104 is a VNF in which the SGW function and the PGW function have been activated by the VNFM 36. FIG. 14 is different from FIG. 13 in that the MME is activated as software in the VNF, not as the physical node. Further, the VNF (MME) 102 and the VNF (S/P-GW) 104 are controlled by the VNFM 36, which is a common VNFM. Further, the NFVI 42 may be, as shown in FIG. 14, a physical resource that is common to the VNF (MME) 102 and the VNF (S/P-GW) 104, and the VNF (MME) 102 and the VNF (S/P-GW) 104 may use NFVIs different from each other. While the NFVI 42 is indicated as the physical resource that is common to a plurality of VNFs in FIG. 15 and the subsequent drawings, a different NFVI may be used for each VNF.

Figure 15:
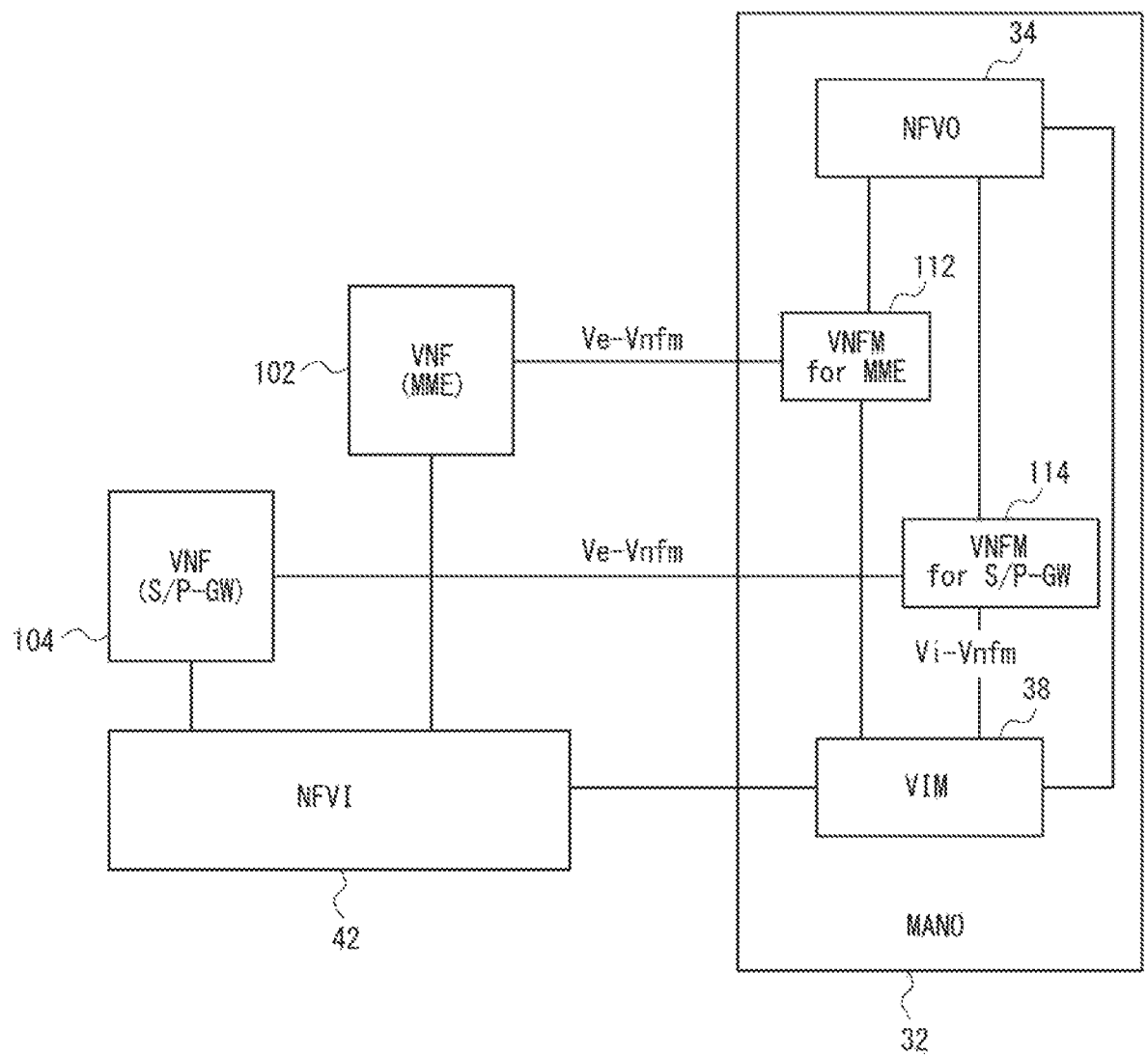
FIG. 15 is a diagram showing Modified Example 2 of the connection form between the MME and the MANO according to the seventh embodiment.

With reference next to FIG. 15, a connection form different from the connection forms of FIGS. 13 and 14 will be explained. In FIG. 15, a VNFM for MME 112 is a VNFM that controls the VNF (MME) 102, and a VNFM for S/P-GW 114 is a VNFM that controls the VNF (S/P-GW) 104.

FIG. 15 is different from FIG. 14 in that the VNFMs that control the VNF (MME) 102 and the VNF (S/P-GW) 104 are different from each other.

Figure 16:
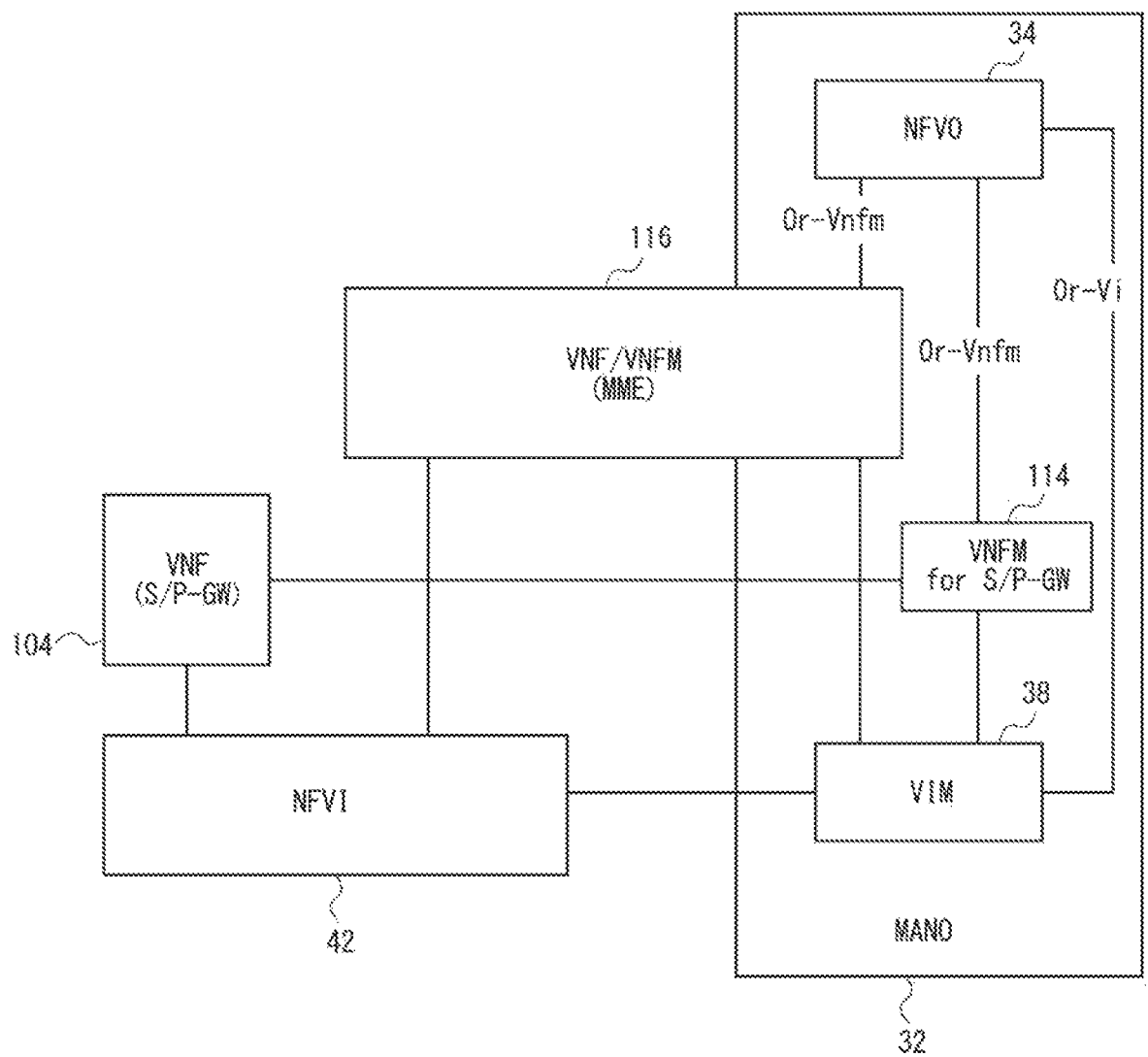
FIG. 16 is a diagram showing Modified Example 3 of the connection form between the MME and the MANO according to the seventh embodiment.

With reference next to FIG. 16, a connection form that is different from the connection forms shown in FIGS. 13 to 15 will be explained. In FIG. 16, a VNF/VNFM (MME) 116 shows that the VNF and the VNFM are achieved by one software resource and the MME function has been further activated.

FIG. 16 is different from FIGS. 14 and 15 in that the VNF that activates the MME function and the VNFM that controls the VNF are achieved by one software resource.

As shown in FIGS. 14-16, the MME may serve as the MME function also in the VNF on the NFVI, not as the physical node. Further, as shown in FIGS. 14-16, there are various connection forms between the VNF and the MANO that have activated the MME function and between the VNF and the MANO that have activated the SGW function and the PGW function, whereby it is possible to flexibly construct the network.

Eighth Embodiment

Figure 17:
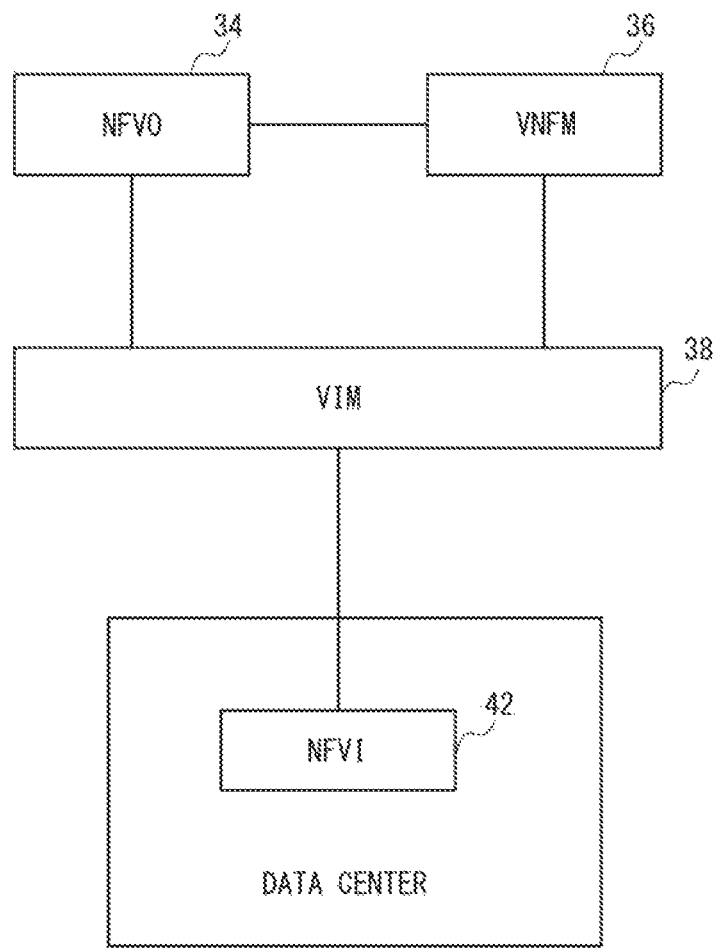
FIG. 17 is a diagram showing a deployment pattern of a VIM that composes a MANO according to an eighth embodiment.
Figure 18:
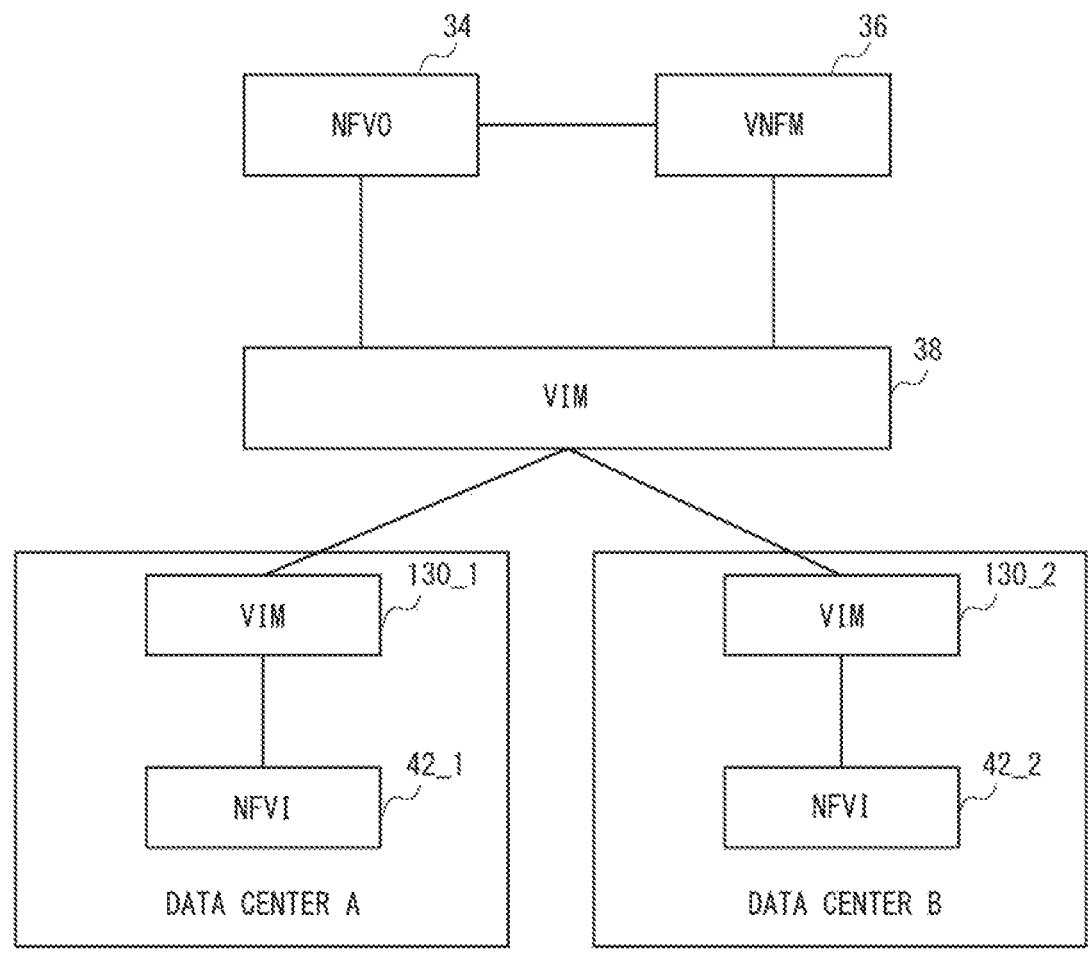
FIG. 18 is a diagram showing Modified Example 1 of the deployment pattern of the VIM that composes the MANO according to the eighth embodiment.
Figure 19:
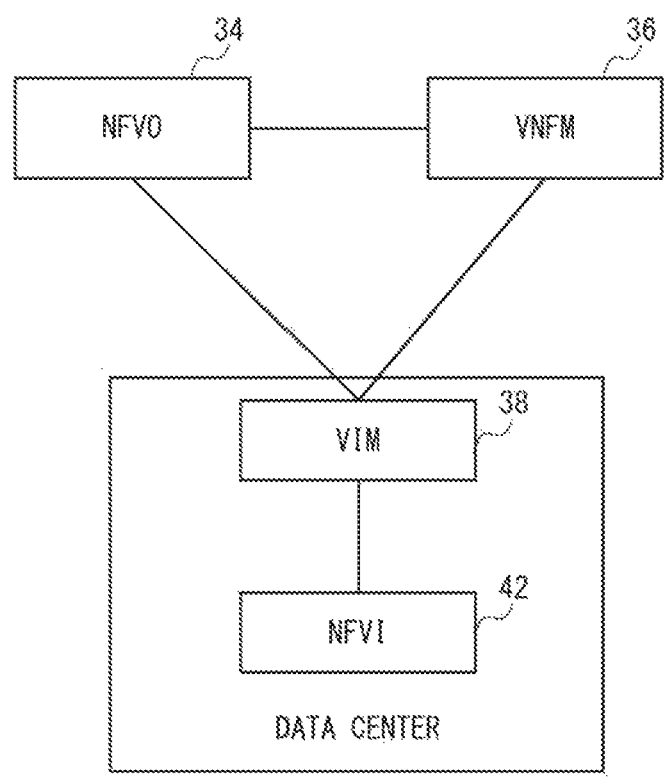
FIG. 19 is a diagram showing Modified Example 2 of the deployment pattern of the VIM that composes the MANO according to the eighth embodiment.
Figure 20:
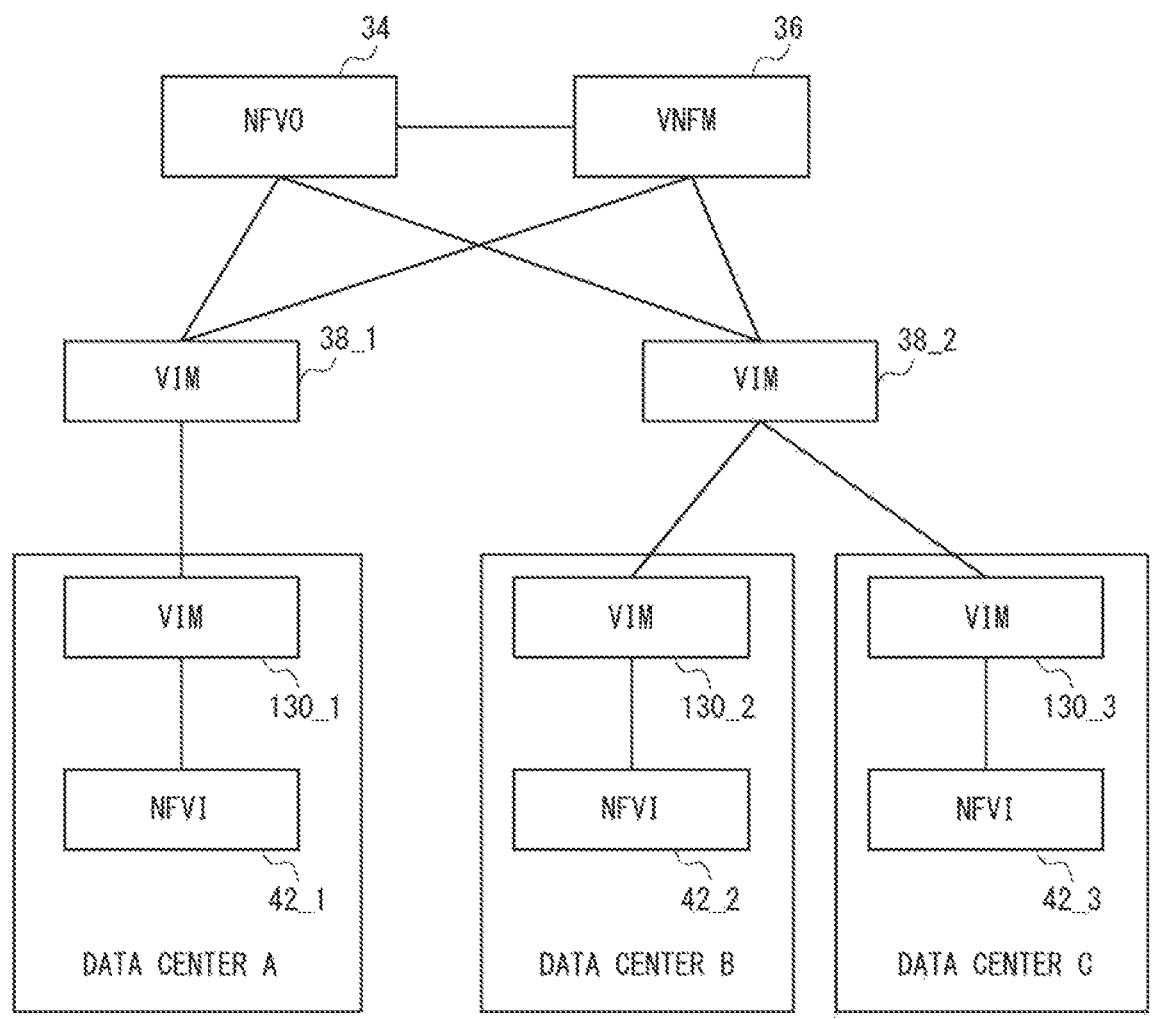
FIG. 20 is a diagram showing Modified Example 3 of the deployment pattern of the VIM that composes the MANO according to the eighth embodiment.

With reference next to FIGS. 17-20, deployment patterns of the VIM 38 that composes the MANO 32 described with reference to FIG. 4 will be explained. FIGS. 18-20 are described as Modified Examples of FIG. 17. FIGS. 17-20 show that the NFVI 42 is deployed in a data center. The data center may be replaced by, for example, a building or a central office.

In FIG. 17, the VIM 38 selects the NFVI 42 to be activated using the positional information regarding the UE 70. The VIM 38 selects, for example, the NFVI 42 in the data center that is located in the vicinity of the eNB 72 that communicates with the UE 70 by radio.

FIG. 18 shows that a VIM 130 is present for each NFVI 42 deployed in the data center. Specifically, a VIM 130_1 and an NFVI 42_1 are present in a data center A, and a VIM 130_2 and an NFVI 42_2 are present in a data center B. The VIM 130 is a general term for the VIM 130_1, the VIM 130_2, and a VIM 130_n (n is an integer equal to or larger than 1), and the NFVI 42 is a general term for the NFVI 42_1, the NFVI 42_2, and an NFVI 42_n (n is an integer equal to or larger than 1). FIG. 18 shows that the VIM 38 and the VIM 130 are hierarchized. The VIM 38 is a VIM that is located on a higher level of the VIM 130. The VIM 130 may be referred to as, for example, a child VIM or the like of the VIM 38. The VIM 38 may be referred to as, for example, a parent VIM or the like of the VIM 130.

In FIG. 18, the VIM 38 selects the VIM 130 in the data center located in the vicinity of the UE 70 using the positional information regarding the UE 70. When, for example, the data center A is located in the vicinity of the eNB 72 that communicates with the UE 70 by radio, the VIM 38 selects the VIM 130_1 deployed in the data center A. The VIM 130_1 activates the NFVI 42_1.

FIG. 19 shows that the VIM 38 is present for each data center. In FIG. 19, the NFVO 34 selects the VIM 38 in the data center located in the vicinity of the UE 70 using the positional information regarding the UE 70.

FIG. 20 shows that the VIM 38 and the VIM 130 are present for each NFVI 42 deployed in the data center. Specifically, the VIM 130_1 and the NFVI 42_1 are present in the data center A. Further, the VIM 38_1 is present as a higher-level apparatus of the VIM 130_1. The VIM 38_1 may be present in a location different from the data center A or may be disposed in the data center A. The VIM 130_2 and the NFVI 42_2 are present in the data center B. The VIM 130_3 and the NFVI 42_3 are present in the data center C. Further, the VIM 38_2 is present as a higher-level apparatus of the VIM 130_2 and the VIM 130_3. The VIM 38_2 may be present in a location different from the data centers B and C or may be disposed in the data center B or the data center C.

When, for example, the data center C is located in the vicinity of the eNB 72 that communicates with the UE 70 by radio, the NFVO 34 selects the VIM 38_2. Further, the VIM 38_2 selects the VIM 130_3 deployed in the data center C. The VIM 130_3 activates the NFVI 42_3.

As shown in FIGS. 17-20, one of the NFVO 34 and the VIM 38 may select the NFVI to be activated based on the positional information regarding the UE 70. Further, by hierarchizing the VIMs, the processing load of the VIMs may be dispersed. In this way, the arrangement of the VIM 38 that composes the MANO 32 can be determined in a flexible manner.

With reference next to FIG. 21, reference points at which the positional information regarding the UE 70 flows, the reference points being changed in accordance with the configuration of the virtualization system, will be explained. FIG. 21 associates the deployment pattern of the VIM, the operations of the NFVO/VFNM, the operation of the VIM, and the reference point through which the positional information flows shown in FIGS. 17-20 with one another.

When the VIM is deployed as shown in FIG. 17, the NFVO 34 and the VNFM 36 output the positional information transmitted from the MME 90 to the VIM 38 without performing processing using the positional information transmitted from the MME 90. The VIM 38 selects the NFVI 42 using the received positional information. Further, when the deployment pattern of the VIM is as shown in FIG. 17 and the connection form between the MME and the MANO is as shown in FIG. 13, the VIM 38 acquires the positional information via Os-Ma-nfvo and Or-Vi. When the deployment pattern of the VIM is as shown in FIG. 17 and the connection form between the MME and the MANO is as shown in FIG. 14 or 15, the VIM 38 acquires the positional information via Ve-Vnfm and Vi-Vnfm. When the deployment pattern of the VIM is as shown in FIG. 17 and the connection form between the MME and the MANO is as shown in FIG. 16, the VIM 38 acquires the positional information via Or-Vnfm and Or-Vi.

When the VIM is deployed as shown in FIG. 18, the NFVO 34 and the VNFM 36 do not perform processing that uses the positional information transmitted from the MME 90 and outputs the positional information transmitted from the MME 90 to the VIM 38. The VIM 38 selects the NFVI 42 and the VIM 130 using the received positional information. Further, when the deployment pattern of the VIM is as shown in FIG. 18 and the connection form between the MME and the MANO is as shown in FIG. 13, the VIM 38 acquires the positional information via Os-Ma-nfvo and Or-Vi. When the deployment pattern of the VIM is as shown in FIG. 18 and the connection form between the MME and the MANO is as shown in FIG. 14 or 15, the VIM 38 acquires the positional information via Ve-Vnfm and Vi-Vnfm. When the deployment pattern of the VIM is as shown in FIG. 18 and the connection form between the MME and the MANO is as shown in FIG. 16, the VIM 38 acquires the positional information via Or-Vnfm and Or-Vi.

When the VIM is deployed as shown in FIG. 19, the NFVO 34 and the VNFM 36 select the VIM 38 using the positional information transmitted from the MME 90. The NFVO 34 and the VNFM 36 do not transmit the positional information to the VIM 38. That is, the VIM 38 does not receive the positional information from the NFVO 34 and the VNFM 36. Further, when the deployment pattern of the VIM is as shown in FIG. 19 and the connection form between the MME and the MANO is as shown in FIG. 13, the NFVO 34 acquires the positional information via Os-Ma-nfvo. When the deployment pattern of the VIM is as shown in FIG. 19 and the connection form between the MME and the MANO is as shown in FIG. 14 or 15, the VNFM 36 acquires the positional information via Ve-Vnfm. When the deployment pattern of the VIM is as shown in FIG. 19 and the connection form between the MME and the MANO is as shown in FIG. 16, the NFVO 34 acquires the positional information via Or-Vnfm.

When the VIM is deployed as shown in FIG. 20, the NFVO 34 and the VNFM 36 select the VIM 38 using the positional information transmitted from the MME 90. Further, the NFVO 34 and the VNFM 36 transmit the positional information to the VIM 38. The VIM 38 selects the VIM 130 using the received positional information or a part of the received positional information. The selection of the VIM may be hierarchically determined using the positional information. The NFVO 34 may select, for example, the VIM 38_2 located in the Kanto region using the positional information and the VIM 38_2 may further select the VIM 130_2 located in Tokyo. Further, the NFVO 34 and the VNFM 36 may transmit a part of the positional information transmitted from the MME 90 to the VIM 38. Further, when the deployment pattern of the VIM is as shown in FIG. 20 and the connection form between the MME and the MANO is as shown in FIG. 13, the VIM 38 acquires the positional information via Os-Ma-nfvo and Or-Vi. When the deployment pattern of the VIM is as shown in FIG. 20 and the connection form between the MME and the MANO is as shown in FIG. 14 or 15, the VIM 38 acquires the positional information via Ve-Vnfm and Vi-Vnfm. When the deployment pattern of the VIM is as shown in FIG. 20 and the connection form between the MME and the MANO is as shown in FIG. 16, the VIM 38 acquires the positional information via Or-Vnfm and Or-Vi.

Further, in each of the reference points, the interface is defined. Further, the positional information is transmitted in the function included in the interface. For example, a Network service lifecycle management interface and a VNF Lifecycle Management interface are defined in Os-Ma-nfvo. Further, the Network service lifecycle management interface includes functions of instantiating a Network Service and updating a Network Service. Further, the VNF Lifecycle Management interface includes a function of instantiating VNF. In Os-Ma-nfvo, the positional information is transmitted in at least one of functions of instantiating a Network Service, updating a Network Service, and instantiating VNF.

Further, a VNF Lifecycle Management interface is defined in Ve-Vnfm and Or-Vnfm. In Ve-Vnfm and Or-Vnfm, the positional information is transmitted in the function that the VNF Lifecycle Management interface includes.

Further, in Or-Vi and Vi-Vnfm, a Virtualised Resources Management is defined as an interface. Further, the Virtualised Resources Management includes functions of requesting the instantiation of virtualized resources, updating instantiated virtualized resources, and resource reservations. In Or-Vi and Vi-Vnfm, the positional information is transmitted in at least one of functions of requesting the instantiation of virtualized resources, updating instantiated virtualized resources, and resource reservations.

Further, each function that the interface includes may be used as a signal name transmitted at the reference point.

In the following description, a configuration example of node apparatuses such as the NE 22, the NE 24, the MANO 32, the MEC 83, and the MME 90 described in the aforementioned embodiments will be explained.

Figure 22:
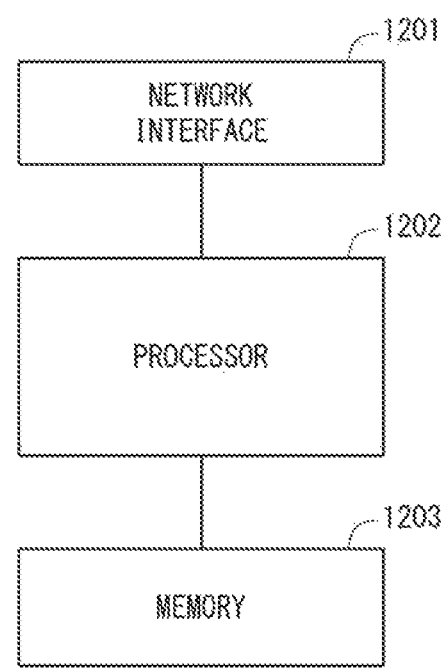
FIG. 22 is a configuration diagram of a node apparatus according to each embodiment.

FIG. 22 is a block diagram showing a configuration example of each node apparatus. Referring to FIG. 22, the node apparatus includes a network interface 1201, a processor 1202, and a memory 1203. The network interface 1201 is used to communicate with a network node (e.g., the eNodeB130, the MME, or the P-GW). The network interface 1201 may include, for example, a network interface card (NIC) conforming to the IEEE 802.3 series.

The processor 1202 loads the software (computer program) from the memory 1203 and executes the loaded software, thereby performing processing of the node apparatuses described using the sequence diagrams and the flowcharts in the aforementioned embodiments. The processor 1202 may be, for example, a microprocessor, an MPU, or a CPU. The processor 1202 may include a plurality of processors.

The memory 1203 is composed of a volatile memory and a nonvolatile memory. The memory 1203 may include a storage located apart from the processor 1202. In this case, the processor 1202 may access the memory 1203 via an I/O interface (not shown).

In the example shown in FIG. 22, the memory 1203 is used to store software modules. The processor 1202 loads these software modules from the memory 1203 and executes the loaded software modules, thereby being able to perform processing of the node apparatuses described in the aforementioned embodiments.

As described above with reference to FIG. 22, each of the processors included in the node apparatuses in the aforementioned embodiments executes one or more programs including instructions for causing a computer to perform the algorithm described with reference to the drawings.

In the aforementioned examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the aforementioned embodiments and may be changed as appropriate without departing from the spirit of the present disclosure. Further, the present disclosure may be executed by combining the embodiments as appropriate.

While the present disclosure has been described above with reference to the embodiments, the present disclosure is not limited to the aforementioned embodiments. Various changes that one skilled in the art may understand can be made to the configurations and the details of the present disclosure within the scope of the present disclosure.

While a part or all of the aforementioned embodiments may be described as shown in the following Supplementary Notes, they are not limited to them.

(Supplementary Note 1)

A communication system comprising:

a communication terminal;

a base station connected to the communication terminal;

a management apparatus configured to manage positional information regarding the communication terminal;

a server configured to provide a communication service for the communication terminal;

a communication apparatus configured to connect the base station to the server; and a control apparatus configured to control start or stop of a communication function that the communication apparatus includes, wherein the server is arranged in the vicinity of the base station, the management apparatus transmits the positional information regarding the communication terminal to the control apparatus, the control apparatus controls start or stop of the communication function that the communication apparatus includes based on the positional information, and the control apparatus notifies the communication terminal of start or stop of the communication function via the management apparatus.

(Supplementary Note 2)

The communication system according to Supplementary Note 1, wherein the communication apparatus comprises a virtualization apparatus.

(Supplementary Note 3)

The communication system according to Supplementary Note 1 or 2, wherein the communication function is a gateway function that connects the communication terminal to the server.

(Supplementary Note 4)

The communication system according to any one of Supplementary Notes 1 to 3, wherein the management apparatus manages a position registration area of the communication terminal or base station identification information regarding the base station as positional information regarding the communication terminal.

(Supplementary Note 5)

The communication system according to any one of Supplementary Notes 1 or 4, wherein the management apparatus receives address information allocated to the communication apparatus from the control apparatus.

(Supplementary Note 6)

The communication system according to Supplementary Note 5, wherein the management apparatus further receives address information regarding the server from the control apparatus.

(Supplementary Note 7)

The communication system according to Supplementary Note 5, wherein the management apparatus transmits a message for requesting acquisition of address information regarding the server to the communication apparatus in accordance with the address information and receives address information regarding the server from the communication apparatus.

(Supplementary Note 8)

The communication system according to Supplementary Note 3, wherein the management apparatus transmits positional information regarding the communication terminal to the control apparatus when the gateway function is not activated in the communication apparatus.

(Supplementary Note 9)

The communication system according to Supplementary Note 3 or 8, further comprising a DNS that manages address information regarding the communication apparatus, wherein the management apparatus determines that the gateway function is not activated in the communication apparatus when address information allocated to the communication apparatus is not present in the DNS.

(Supplementary Note 10)

The communication system according to Supplementary Note 9, wherein the DNS receives address information allocated to the communication apparatus from the control apparatus.

(Supplementary Note 11)

A management apparatus comprising:

a positional information management unit configured to manage positional information regarding a communication terminal connected to a base station; and a communication unit configured to transmit the positional information regarding the communication terminal to a control apparatus configured to control start or stop of a communication function included in a communication apparatus based on the positional information, the communication apparatus being configured to connect the base station to a server configured to provide a communication service for the communication terminal, wherein the server is arranged in the vicinity of the base station and the control apparatus notifies the communication terminal of start or stop of the communication function via the control apparatus.

(Supplementary Note 12)

The management apparatus according to Supplementary Note 11, wherein the communication unit transmits a position registration area of the communication terminal or base station identification information regarding the base station as the positional information regarding the communication terminal.

(Supplementary Note 13)

The management apparatus according to Supplementary Note 11 or 12, wherein the communication unit receives address information allocated to the communication apparatus from the control apparatus.

(Supplementary Note 14)

The management apparatus according to Supplementary Note 13, wherein the communication unit further receives address information regarding the server from the control apparatus.

(Supplementary Note 15)

The management apparatus according to Supplementary Note 13, wherein the communication unit transmits a message for requesting acquisition of address information regarding the server to the communication apparatus in accordance with the address information, and receives the address information regarding the server from the communication apparatus.

(Supplementary Note 16)

The management apparatus according to any one of Supplementary Notes 11 to 15, wherein when a gateway function is not activated in the communication apparatus, the communication unit transmits positional information regarding the communication terminal to the control apparatus, and the gateway function connects the communication terminal to the server.

(Supplementary Note 17)

The management apparatus according to Supplementary Note 16, wherein the communication unit determines that the gateway function is not activated in the communication apparatus when address information allocated to the communication apparatus is not present in a DNS that manages address information regarding the communication apparatus.

(Supplementary Note 18)

A communication method comprising:

managing positional information regarding a communication terminal connected to a base station; and transmitting the positional information regarding the communication terminal to a control apparatus configured to control start or stop of a communication function included in a communication apparatus based on the positional information, the communication apparatus being configured to connect the base station to a server configured to provide a communication service for the communication terminal, wherein the server is arranged in the vicinity of the base station and the control apparatus notifies the communication terminal of start or stop of the communication function via the control apparatus.

(Supplementary Note 19)

A program for causing a computer to perform the following processing of:

managing positional information regarding a communication terminal connected to a base station; and transmitting positional information regarding the communication terminal to a control apparatus configured to control start or stop of a communication function included in a communication apparatus based on the positional information, the communication apparatus being configured to connect the base station to a server configured to provide a communication service for the communication terminal, wherein the server is arranged in the vicinity of the base station and the control apparatus notifies the communication terminal of start or stop of the communication function via the control apparatus.

REFERENCE SIGNS LIST

10 COMMUNICATION TERMINAL
20 BASE STATION
22 NE
23 EMS
24 NE
30 MANAGEMENT APPARATUS
32 MANO
34 NFVO
36 VNFM
38 VIM
40 COMMUNICATION APPARATUS
42 NFVI
44 VNF
46 VNF
47 EMS
50 SERVER
60 CONTROL APPARATUS
61 OSS/BSS
62 NMS
64 DM
65 EMS
66 DM
67 EMS
70 UE
71 LOCAL GW
72 eNB
73 LOCAL SERVER
74 SGW
76 PGW
78 VIRTUAL SGW
80 VIRTUAL PGW
82 MEC SERVER
83 MEC
84 EXTERNAL NW
86 SERVER
90 MME
92 POSITIONAL INFORMATION MANAGEMENT UNIT
94 COMMUNICATION UNIT
100 DNS
102 VNF (MME)
104 VNF (S/P-GW)
112 VNFM for MME
114 VNFM for S/P-GW
116 VNF/VNFM (MME)
120 DHCP
130 VIM

The invention claimed is:

1. A communication system comprising:
a communication terminal;
a base station connected to the communication terminal;
a management apparatus configured to manage positional information regarding the communication terminal;
a server configured to provide a communication service for the communication terminal;
a communication apparatus configured to connect the base station to the server; and
a control apparatus configured to control start or stop of a communication function that the communication apparatus includes, wherein
the server is arranged in the vicinity of the base station, the vicinity being a distance between the base station and the server shorter than a predetermined distance,
wherein the management apparatus comprises;
at least one memory storing instructions, and
at least one processor configured to execute the instructions to;
transmit the positional information regarding the communication terminal to the control apparatus,
wherein the control apparatus comprises;
at least one memory storing instructions, and
at least one processor configured to execute the instructions to;
control start or stop of the communication function that the communication apparatus includes based on the positional information, and
wherein the communication terminal comprises;
at least one memory storing instructions, and
at least one processor configured to execute the instructions to;
receive the communication service from the server via the communication apparatus in which the communication function has been activated,
wherein the communication function is a gateway function that connects the communication terminal to the server,
wherein the communication system further comprising a domain name system;
wherein the domain name system comprises;
at least one memory storing instructions, and
at least one processor configured to execute the instructions to;

manage address information regarding the communication apparatus,
wherein the at least one processor of the management apparatus is further configured to execute the instructions to determine that the gateway function is not activated in the communication apparatus when the address information allocated to the communication apparatus is not present in the domain name system.

2. The communication system according to claim 1, wherein the control apparatus controls start or stop of the communication apparatus based on, besides the positional information regarding the communication terminal, at least one of a type of the communication terminal, a type of a service that has been requested, and a delay time that the service requests.

3. The communication system according to claim 1, wherein the at least one processor of the control apparatus is further configured to execute the instructions to notify the communication terminal of start or stop of the communication function of the communication apparatus.

4. The communication system according to claim 1, wherein the communication apparatus comprises a virtualization apparatus.

5. The communication system according to claim 1, wherein the at least one processor of the management apparatus is further configured to execute the instructions to manage a position registration area of the communication terminal or base station identification information regarding the base station as the positional information regarding the communication terminal.

6. The communication system according to claim 1, wherein the at least one processor of the management apparatus is further configured to execute the instructions to receive, from the control apparatus, address information allocated to the communication apparatus.

7. The communication system according to claim 1, wherein the at least one processor of the management apparatus is further configured to execute the instructions to receive address information regarding the server from the control apparatus.

8. The communication system according to claim 1, wherein the at least one processor of the domain name system is further configured to execute the instructions to receive, from the control apparatus, the address information allocated to the communication apparatus.

9. A management apparatus comprising:
at least one memory storing instructions, and
at least one processor configured to execute the instructions to;
manage positional information regarding a communication terminal connected to a base station; and
transmit the positional information regarding the communication terminal to a control apparatus configured to control start or stop of a communication function included in a communication apparatus configured to connect the base station to a server arranged in the vicinity of the base station, the vicinity being a distance between the base station and the server shorter than a predetermined distance, wherein the at least one processor is further configured to execute the instructions to determine, when address information allocated to the communication apparatus is not present in a domain name system that manages address information regarding the communication apparatus, that a gateway function that connects the communication terminal to the server is not activated in the communication apparatus, and transmits the positional information regarding the communication terminal to the control apparatus.

10. The management apparatus according to claim 9, wherein the at least one processor is further configured to execute the instructions to transmit a position registration area of the communication terminal or base station identification information regarding the base station as the positional information regarding the communication terminal.

11. The management apparatus according to claim 9, wherein the at least one processor is further configured to execute the instructions to receive address information allocated to the communication apparatus from the control apparatus.

12. The management apparatus according to claim 9, wherein the at least one processor is further configured to execute the instructions to receive address information regarding the server from the control apparatus.

13. A communication method, wherein
a management apparatus configured to manage positional information regarding a communication terminal determines, when address information allocated to a communication apparatus is not present in a domain name system that manages address information regarding the communication apparatus, that a gateway function that connects the communication terminal to a server is not activated in the communication apparatus, the communication apparatus being configured to connect a base station to which the communication terminal is connected and the server being arranged in the vicinity of the base station, the vicinity being a distance between the base station and the server shorter than a predetermined distance,
the management apparatus transmits the positional information regarding the communication terminal to a control apparatus,
the control apparatus controls start or stop of the gateway function based on the positional information, and
the communication terminal receives a communication service from the server via the communication apparatus in which the gateway function has been activated.

14. The communication method according to claim 13, wherein the control apparatus controls start or stop of the communication apparatus based on, besides the positional information regarding the communication terminal, at least one of a type of the communication terminal, a type of a service that has been requested, and a delay time that the service requests.

15. The communication method according to claim 13, wherein the control apparatus notifies the communication terminal of start or stop of the gateway function of the communication apparatus.

* * * * *